(12) United States Patent
Cholleton

(10) Patent No.: US 12,363,066 B2
(45) Date of Patent: Jul. 15, 2025

(54) SYSTEMS, DEVICES, AND METHODS FOR GENERATING A DOMAIN NAME USING A USER INTERFACE

(71) Applicant: VeriSign, Inc., Reston, VA (US)

(72) Inventor: Aubry Cholleton, Fribourg (CH)

(73) Assignee: VeriSign, Inc., Reston, VA (US)

( * ) Notice: Subject to any disclaimer, the term of this patent is extended or adjusted under 35 U.S.C. 154(b) by 0 days.

(21) Appl. No.: 18/748,959

(22) Filed: Jun. 20, 2024

(65) Prior Publication Data
US 2024/0340263 A1    Oct. 10, 2024

Related U.S. Application Data

(60) Division of application No. 18/130,252, filed on Apr. 3, 2023, now abandoned, which is a continuation of
(Continued)

(51) Int. Cl.
*H04L 61/30*      (2022.01)
*G06F 3/048*      (2013.01)
(Continued)

(52) U.S. Cl.
CPC .......... *H04L 61/3025* (2013.01); *G06F 3/048* (2013.01); *G06F 40/284* (2020.01); *H04L 61/302* (2013.01)

(58) Field of Classification Search
CPC . H04L 61/3025; H04L 61/302; G06F 40/284; G06F 3/048
(Continued)

(56) References Cited

U.S. PATENT DOCUMENTS

| 5,396,621 A | 3/1995 | MacGregor et al. |
| 5,467,448 A | 11/1995 | Hilton et al. |

(Continued)

OTHER PUBLICATIONS

Aery, Website Redesign Portal Mockups. Duke University Libraries Blogs, retrieved online at: https://blogs.library.duke.edu/blog/2013/08/13/website-redesign-portal-mockups. 3 pages, Aug. 13, 2013.
(Continued)

*Primary Examiner* — Anthony Mejia
(74) *Attorney, Agent, or Firm* — McCarter & English, LLP; Michael A. Sartori

(57) ABSTRACT

Embodiments relate to systems, devices, computer-readable media, and computer-implemented methods for generating domain name suggestions by receiving an input string via a user interface, determining an alternative of the input string, determining affixes of the input string, determining top level domains associated with the input string, determining registration availability of domain names including one-step string sequences from the input string based on the alternative input string, the affixes of the input string, and the top level domains associated with the input string, and generating a display for the user interface, where the display includes: the input string, the alternative of the input string, the affixes of the input string, and the top level domains associated with the input string; and indications of the registration availability of the domains names including the one-step string sequences.

31 Claims, 28 Drawing Sheets

Related U.S. Application Data application No. 17/156,935, filed on Jan. 25, 2021, now Pat. No. 11,621,940, which is a continuation of application No. 15/663,402, filed on Jul. 28, 2017, now Pat. No. 10,904,211.

(60) Provisional application No. 62/448,990, filed on Jan. 21, 2017.

(51) Int. Cl.
*G06F 40/284* (2020.01)
*H04L 61/3015* (2022.01)

(58) Field of Classification Search
USPC .......................................................... 709/245
See application file for complete search history.

(56) References Cited

U.S. PATENT DOCUMENTS

| | | | |
|---|---|---|---|
| 5,625,818 A | 4/1997 | Zarmer et al. | |
| 5,841,435 A | 11/1998 | Dauerer et al. | |
| D404,385 S | 1/1999 | Hodgson | |
| D423,485 S | 4/2000 | Faris et al. | |
| D428,398 S | 7/2000 | Coleman | |
| 6,895,430 B1 * | 5/2005 | Schneider | H04L 61/3025 707/999.005 |
| D550,681 S | 9/2007 | Totten et al. | |
| 7,386,849 B2 | 6/2008 | Dageville et al. | |
| D575,296 S | 8/2008 | Fairfield et al. | |
| 7,426,576 B1 * | 9/2008 | Banga | H04L 61/4552 709/245 |
| 7,577,919 B2 | 8/2009 | Hoshino | |
| D607,001 S | 12/2009 | Ording | |
| D608,366 S | 1/2010 | Matas | |
| 7,650,331 B1 | 1/2010 | Dean et al. | |
| 7,778,934 B2 | 8/2010 | Graves et al. | |
| D632,700 S | 2/2011 | Brinda | |
| D633,921 S | 3/2011 | Brinda | |
| 8,069,417 B2 | 11/2011 | Brush et al. | |
| 8,140,601 B2 | 3/2012 | Plastina et al. | |
| D658,667 S | 5/2012 | Cho et al. | |
| D659,706 S | 5/2012 | David et al. | |
| D660,860 S | 5/2012 | Louch et al. | |
| D663,741 S | 7/2012 | Cielak et al. | |
| D664,968 S | 8/2012 | Lee et al. | |
| D680,125 S | 4/2013 | Chaudhri et al. | |
| D682,875 S | 5/2013 | Frijlink et al. | |
| 8,447,856 B2 | 5/2013 | Drako | |
| D688,256 S | 8/2013 | Christie et al. | |
| D689,082 S | 9/2013 | Stiffler | |
| D695,780 S | 12/2013 | Edwards et al. | |
| D699,739 S | 2/2014 | Voreis et al. | |
| D699,743 S | 2/2014 | Arnold et al. | |
| 8,655,307 B1 | 2/2014 | Walker et al. | |
| 8,793,606 B2 | 7/2014 | Kim | |
| D710,374 S | 8/2014 | Meegan et al. | |
| D711,418 S | 8/2014 | Xie et al. | |
| D715,822 S | 10/2014 | Sureshkumar | |
| 8,874,764 B2 | 10/2014 | Scott et al. | |
| D720,765 S | 1/2015 | Xie et al. | |
| D720,766 S | 1/2015 | Mandal et al. | |
| D721,382 S | 1/2015 | Brinda et al. | |
| D722,319 S | 2/2015 | Moore | |
| D725,133 S | 3/2015 | Smirin et al. | |
| 8,990,356 B2 | 3/2015 | McPherson et al. | |
| 9,015,323 B2 | 4/2015 | Kommula | |
| 9,065,794 B2 | 6/2015 | Smith et al. | |
| D733,737 S | 7/2015 | Omiya | |
| D733,738 S | 7/2015 | Omiya | |
| D735,742 S | 8/2015 | Lee et al. | |
| D737,283 S | 8/2015 | Scalisi | |
| 9,117,447 B2 | 8/2015 | Gruber et al. | |
| D738,910 S | 9/2015 | Drozd et al. | |
| D741,357 S | 10/2015 | Seo et al. | |
| D744,000 S | 11/2015 | Villamor et al. | |
| D746,847 S | 1/2016 | Bauer | |
| D746,866 S | 1/2016 | Memoria et al. | |
| D748,114 S | 1/2016 | Leyon | |
| D748,121 S | 1/2016 | Bauer et al. | |
| D749,625 S | 2/2016 | Yang et al. | |
| D750,120 S | 2/2016 | Kovacevic et al. | |
| D753,693 S | 4/2016 | Hashimoto | |
| D753,703 S | 4/2016 | Villamor et al. | |
| D754,718 S | 4/2016 | Zhou | |
| D754,719 S | 4/2016 | Zha | |
| D757,082 S | 5/2016 | Discenzo et al. | |
| D758,386 S | 6/2016 | Zhang | |
| D759,673 S | 6/2016 | Looney et al. | |
| D759,674 S | 6/2016 | Looney et al. | |
| D759,675 S | 6/2016 | Looney et al. | |
| D759,687 S | 6/2016 | Chang et al. | |
| D759,688 S | 6/2016 | Wu | |
| D760,275 S | 6/2016 | Zhang | |
| D760,770 S | 7/2016 | Zhu | |
| D761,294 S | 7/2016 | Weeresinghe | |
| D761,816 S | 7/2016 | Kobetz et al. | |
| D763,882 S | 8/2016 | Liang | |
| D763,904 S | 8/2016 | Knapp et al. | |
| D764,501 S | 8/2016 | Dias et al. | |
| D764,528 S | 8/2016 | Choi et al. | |
| D765,101 S | 8/2016 | Park et al. | |
| D765,707 S | 9/2016 | Gomez | |
| D768,661 S | 10/2016 | Mcrae et al. | |
| D768,692 S | 10/2016 | Jahani et al. | |
| D769,263 S | 10/2016 | Kisselev et al. | |
| D769,303 S | 10/2016 | Rodriguez | |
| D772,272 S | 11/2016 | Davydov et al. | |
| D773,495 S | 12/2016 | Mcrae et al. | |
| D774,051 S | 12/2016 | Hart et al. | |
| D776,140 S | 1/2017 | Andress et al. | |
| 9,583,142 B1 | 2/2017 | Zhu et al. | |
| D783,036 S | 4/2017 | Yang et al. | |
| D788,800 S | 6/2017 | Wu et al. | |
| D789,956 S | 6/2017 | Ortega et al. | |
| D790,578 S | 6/2017 | Hatzikostas | |
| D790,590 S | 6/2017 | Hart et al. | |
| 9,742,753 B2 | 8/2017 | Talley | |
| D796,540 S | 9/2017 | McLean et al. | |
| D805,526 S | 12/2017 | Ternoey | |
| D805,527 S | 12/2017 | Ternoey | |
| D807,910 S | 1/2018 | Graham et al. | |
| D812,071 S | 3/2018 | Riedel | |
| D815,135 S | 4/2018 | Spector | |
| D820,292 S | 6/2018 | Mander et al. | |
| D822,702 S | 7/2018 | Gandhi et al. | |
| D823,867 S | 7/2018 | Berlow | |
| D823,871 S | 7/2018 | Verdu Orts et al. | |
| D824,939 S | 8/2018 | Sagrillo et al. | |
| D836,662 S | 12/2018 | Mancuso et al. | |
| D837,241 S | 1/2019 | Dilag et al. | |
| D842,322 S | 3/2019 | Torrento et al. | |
| 10,242,018 B2 | 3/2019 | Jagadeesh et al. | |
| D844,649 S | 4/2019 | Bessette et al. | |
| D844,658 S | 4/2019 | Cholleton | |
| D845,323 S | 4/2019 | Clediere et al. | |
| D845,337 S | 4/2019 | Hemsley | |
| D852,213 S | 6/2019 | Clediere et al. | |
| 10,318,142 B2 | 6/2019 | Armstrong | |
| D859,450 S | 9/2019 | Krishna | |
| D861,712 S | 10/2019 | Hassan et al. | |
| D864,245 S | 10/2019 | Szeto et al. | |
| D881,916 S | 4/2020 | Mead et al. | |
| D882,602 S | 4/2020 | Bessette et al. | |
| D896,256 S | 9/2020 | Kawaichi et al. | |
| D899,433 S | 10/2020 | Moran et al. | |
| 10,904,211 B2 | 1/2021 | Cholleton | |
| D917,552 S | 4/2021 | Bessette et al. | |
| D956,072 S | 6/2022 | Bessette et al. | |
| 11,621,940 B2 | 4/2023 | Cholleton | |
| 2002/0007378 A1 | 1/2002 | Tanaka et al. | |
| 2002/0010794 A1 * | 1/2002 | Stanbach, Jr. | H04L 67/53 707/E17.116 |
| 2002/0055951 A1 | 5/2002 | Shigetomi et al. | |

(56) References Cited

U.S. PATENT DOCUMENTS

| | | | |
|---|---|---|---|
| 2002/0065903 A1 | 5/2002 | Fellman | |
| 2003/0177240 A1 | 9/2003 | Gulko et al. | |
| 2004/0006597 A1* | 1/2004 | Hughes | H04L 61/4555 |
| | | | 709/206 |
| 2004/0044791 A1 | 3/2004 | Pouzzner | |
| 2004/0167982 A1* | 8/2004 | Cohen | H04L 61/4511 |
| | | | 707/E17.112 |
| 2005/0114374 A1 | 5/2005 | Juszkiewicz et al. | |
| 2005/0132300 A1 | 6/2005 | Luhrs | |
| 2005/0172031 A1* | 8/2005 | Adelman | H04L 61/30 |
| | | | 709/228 |
| 2005/0216845 A1* | 9/2005 | Wiener | G06F 16/951 |
| | | | 715/205 |
| 2006/0129665 A1 | 6/2006 | Toebes et al. | |
| 2007/0150611 A1 | 6/2007 | Chan et al. | |
| 2007/0204341 A1 | 8/2007 | Rand et al. | |
| 2008/0059896 A1 | 3/2008 | Anderson et al. | |
| 2008/0071823 A1* | 3/2008 | Fellman | H04L 61/3015 |
| | | | 707/999.102 |
| 2008/0122796 A1 | 5/2008 | Jobs et al. | |
| 2008/0165153 A1 | 7/2008 | Platzer et al. | |
| 2008/0178073 A1 | 7/2008 | Gao et al. | |
| 2008/0181230 A1 | 7/2008 | Hitt et al. | |
| 2008/0254778 A1 | 10/2008 | Kim | |
| 2009/0076726 A1 | 3/2009 | Gemignani, Jr. et al. | |
| 2009/0177453 A1 | 7/2009 | Kouchi et al. | |
| 2009/0228825 A1 | 9/2009 | Van Os et al. | |
| 2010/0070608 A1 | 3/2010 | Hosur | |
| 2010/0100957 A1 | 4/2010 | Graham et al. | |
| 2010/0106731 A1* | 4/2010 | Cartmell | H04L 61/00 |
| | | | 707/769 |
| 2010/0107062 A1 | 4/2010 | Bacus et al. | |
| 2010/0146001 A1* | 6/2010 | Lee | G06F 16/958 |
| | | | 707/E17.107 |
| 2010/0262901 A1 | 10/2010 | DiSalvo | |
| 2011/0047573 A1 | 2/2011 | Onogi et al. | |
| 2011/0059733 A1 | 3/2011 | Kim et al. | |
| 2011/0082780 A1 | 4/2011 | Nagaram et al. | |
| 2011/0093522 A1* | 4/2011 | Chen | H04L 67/1021 |
| | | | 709/227 |
| 2011/0099261 A1 | 4/2011 | Joshi | |
| 2011/0145749 A1 | 6/2011 | Sailor et al. | |
| 2011/0252298 A1 | 10/2011 | Johlic et al. | |
| 2011/0320524 A1* | 12/2011 | Nandagopal | H04L 61/4552 |
| | | | 709/245 |
| 2012/0009601 A1 | 1/2012 | Moriguchi et al. | |
| 2012/0071137 A1 | 3/2012 | Bisrat | |
| 2012/0084281 A1 | 4/2012 | Colosi | |
| 2012/0206653 A1 | 8/2012 | Graves et al. | |
| 2012/0284744 A1 | 11/2012 | Kumar | |
| 2013/0018944 A1 | 1/2013 | Shyamsunder et al. | |
| 2013/0067115 A1* | 3/2013 | Lapanc | H04L 61/106 |
| | | | 709/245 |
| 2013/0072308 A1 | 3/2013 | Peck et al. | |
| 2013/0091143 A1* | 4/2013 | Raemy | G06Q 10/06395 |
| | | | 707/748 |
| 2013/0185311 A1* | 7/2013 | MacMillan | G06Q 30/0201 |
| | | | 707/755 |
| 2013/0191537 A1 | 7/2013 | Ivanov et al. | |
| 2013/0198065 A1 | 8/2013 | McPherson et al. | |
| 2013/0227141 A1 | 8/2013 | Schmidt et al. | |
| 2013/0254089 A1 | 9/2013 | Kirby et al. | |
| 2013/0332850 A1 | 12/2013 | Bovet et al. | |
| 2014/0033071 A1 | 1/2014 | Gruber et al. | |
| 2014/0059466 A1 | 2/2014 | Mairs et al. | |
| 2014/0189608 A1 | 7/2014 | Shuttleworth et al. | |
| 2014/0222424 A1 | 8/2014 | Hartford et al. | |
| 2014/0280305 A1 | 9/2014 | James et al. | |
| 2014/0282016 A1 | 9/2014 | Hosier, Jr. | |
| 2014/0333551 A1 | 11/2014 | Kim et al. | |
| 2015/0039599 A1* | 2/2015 | Carroll | G06F 16/955 |
| | | | 707/723 |
| 2015/0058167 A1 | 2/2015 | Mclaughlin | |
| 2015/0172897 A1 | 6/2015 | Mariathasan et al. | |
| 2015/0215271 A1 | 6/2015 | Gupta | |
| 2015/0215267 A1 | 7/2015 | Kagan | |
| 2015/0234816 A1 | 8/2015 | Chong et al. | |
| 2015/0278188 A1* | 10/2015 | Aras | G06F 40/211 |
| | | | 709/245 |
| 2015/0281111 A1 | 10/2015 | Carl | |
| 2015/0304270 A1 | 10/2015 | Cook | |
| 2016/0065675 A1 | 3/2016 | Brand | |
| 2016/0072847 A1 | 3/2016 | Bremen et al. | |
| 2016/0127305 A1 | 5/2016 | Droms et al. | |
| 2016/0196300 A1* | 7/2016 | Kamdar | H04L 61/302 |
| | | | 707/770 |
| 2016/0210578 A1 | 7/2016 | Raleigh et al. | |
| 2016/0315969 A1 | 10/2016 | Goldstein | |
| 2017/0005914 A1 | 1/2017 | Edge et al. | |
| 2017/0046127 A1 | 2/2017 | Fletcher et al. | |
| 2017/0171151 A1* | 6/2017 | Raemy | G10L 15/10 |
| 2017/0331783 A1* | 11/2017 | Lai | H04L 67/02 |
| 2017/0331786 A1* | 11/2017 | Lai | G06F 40/129 |
| 2017/0351953 A1* | 12/2017 | Raemy | G06N 20/00 |
| 2018/0041466 A9 | 2/2018 | Kagan | |
| 2018/0063162 A1 | 3/2018 | Baughman et al. | |
| 2018/0165607 A1* | 6/2018 | Hagen | G06N 7/01 |
| 2018/0212926 A1 | 7/2018 | Cholleton | |
| 2019/0068549 A1* | 2/2019 | Lakshmanan | G06F 16/9535 |
| 2019/0296984 A1* | 9/2019 | Bladel | G06Q 30/0641 |
| 2021/0144121 A1 | 5/2021 | Cholleton | |
| 2021/0149553 A1 | 5/2021 | Lereya et al. | |

OTHER PUBLICATIONS

Android, Google Brings Its Gboard Keyboard to Android. Retrieved online at: https://www.thunrott.com/mobile/android/86919/google-brings-gboard-keyboard-android. Dec. 16, 2016.

Codepath, Search Bar Guide. Retrieved online at: https://web.archive.org/web/20150320064236/https://guides.codepath.com/ios/Search-Bar-Guide. 12 pages, Mar. 20, 2015.

Damas et al., Extension Mechanisms for DNS (EDNS (0)), Internet Engineering Task Force (IETF) Request for Comments: 6891. 16 pages, Apr. 2013.

Gfycat, Bar chart. Retrieved online at: https://gfycat.com/gifs/detail/accomplishedboldiguanodon. 2 pages, Oct. 27, 2016.

Heron, How should reordering items in a list, and updating multiple objects, be persisted with GraphQL mutations? Apollo, retrieved online at: https://stackoverflow.com/questions/43230615/how-should-reordering -items-in-a-list-and-updating-multiple-objets-be-persist. 4 pages, Apr. 5, 2017.

Karampalasis, Free HD Video Backgrounds-Abstract Blue Wire Squares Animation. Youtube, retrieved oinline at: https://youtube.com/watch?v=06AmEKRwFF0. 2 pages, Apr. 25, 2016.

Khunger, Reorder list using jQuery and ASP.NET, CodeAsp.Net. Retrieved online at: https://codeasp.net/articles/asp-net/65/reorder-list-using-jquery-and-asp-net. 15 pages. (2021).

Oracle Corporation, Configuring a Virtual Switch and the Service Domain for NAT and Routing. Retrieved online at: https://docs.oracle.com/cd/E19604-01/821-0406/configvirtswitchandsvodomainfornatandrouting.index.html. 3 pages, (2010).

r-bloggers.com, run-arbitrary-code.gif. Retrieved online at: https://deanattali.com/img/blog/shinyjs-v08/run-arbitrary-code.gif. Nov. 16, 2016.

Reitnauer, 8 Tools for Finding, Registering and Managing Domain Names. Smashing Magazine, retrieved online at: https://smashingmagazine.com/2009/08/10-tools-find-register-manage-domain-names/ 2 pages, Aug. 29, 2009.

Stunning Solutions, Add-post.gif. Retrieved online at: http://www.stunningsolutions.in/wp-content/uploads/20 14/04/add-post.gif. Apr. 2014.

Youtube, Grabadotcom.com Domain Name Search & Registration iPhone Application. Retrieved online at: https://www.youtube.com/watchv=djAM2BXBmGk. Feb. 3, 2009.

Youtube, How to register Free Domain. Retrieved online at: https://www.youtube.com/watchv=Un4SE5qzYwM. Apr. 30, 2017.

(56) References Cited

OTHER PUBLICATIONS

European Office Action for Application No. 18152816.7, dated Jun. 12, 2019, 5 pages.
European Office Action for Application No. 18152816.7, dated Jun. 15, 2018, 7 pages.
US Final Office Action for U.S. Appl. No. 15/663,402, dated Jun. 8, 2020, 16 pages.
US Final Office Action for U.S. Appl. No. 15/663,402, dated Oct. 24, 2019, 13 pages.
US Non-Final Office Action for U.S. Appl. No. 15/663,402, dated Apr. 11, 2019, 12 pages.
US Non-Final Office Action for U.S. Appl. No. 15/663,402, dated Jan. 8, 2020, 13 pages.
US Non-Final Office Action for U.S. Appl. No. 29/591,569, dated Jun. 13, 2018, 6 pages.
US Non-Final Office Action for Application No. 29/612,159, dated Aug. 30, 2019, 7 pages.
US Non-Final Office Action for U.S. Appl. No. 29/612,159, dated Oct. 31, 2018, 8 pages.
US Non-Final Office Action for U.S. Appl. No. 29/682,168, dated Jun. 23, 2020, 6 pages.
US Notice of Allowability—corrected, U.S. Appl. No. 29/612,159, dated Jun. 12, 2019, 7 pages.
US Notice of Allowance—corrected for U.S. Appl. No. 15/663,402, dated Oct. 30, 2020, 2 pages.
US Notice of Allowance—corrected, for U.S. Appl. No. 29/682,168, dated Oct. 30, 2020, 3 pages.
US Notice of Allowance for U.S. Appl. No. 15/663,402, dated Sep. 23, 2020, 6 pages.
US Notice of Allowance for U.S. Appl. No. 29/591,569, dated Nov. 7, 2018, 7 pages.
US Notice of Allowance for U.S. Appl. No. 29/612,156, dated Nov. 6, 2018, 9 pages.
US Notice of Allowance for U.S. Appl. No. 29/612,159, dated Dec. 30, 2019, 8 pages.
US Notice of Allowance for U.S. Appl. No. 29/612,159, dated Mar. 26, 2019, 7 pages.
US Notice of Allowance for U.S. Appl. No. 29/682,168, dated Oct. 8, 2020, 8 pages.
US Notice of Allowance for U.S. Appl. No. 29/732,675, dated Aug. 6, 2021, 8 pages.
US Restriction Requirement for U.S. Appl. No. 29/591,569, dated Feb. 5, 2018, 5 pages.
US Restriction Requirement for U.S. Appl. No. 29/612,156, dated Sep. 11, 2018, 22 pages.
US Restriction Requirement for U.S. Appl. No. 29/612,159, dated Sep. 11, 2018, 23 pages.

* cited by examiner

SYSTEMS, DEVICES, AND METHODS FOR GENERATING A DOMAIN NAME USING A USER INTERFACE

RELATED APPLICATIONS

The present application is a divisional of U.S. patent application Ser. No. 18/130,252, filed Apr. 3, 2023, which is a continuation of U.S. patent application Ser. No. 17/156,935, filed Jan. 25, 2021, which is a continuation of U.S. patent application Ser. No. 15/663,402, filed Jul. 28, 2017, which claims the benefit of, and priority to, U.S. Provisional Patent Application No. 62/448,990, entitled, "SYSTEMS, DEVICES, AND METHODS FOR GENERATING A DOMAIN NAME USING A USER INTERFACE" filed Jan. 21, 2017, the entireties of which are hereby incorporated by reference.

BACKGROUND

The Domain Name System ("DNS") is the part of the Internet infrastructure that translates human-readable domain names into the Internet Protocol ("IP") numbers needed to establish TCP/IP communication over the Internet. DNS allows users to refer to web sites, and other resources, using easier to remember domain names, such as "www.example.com", rather than the numeric IP addresses associated with a website, e.g., 123.4.56.78, and assigned to computers on the Internet. Each domain name can be made up of a series of character strings (e.g., labels) separated by dots. The right-most label in a domain name is known as the top-level domain ("TLD"). Examples of well-known TLDs are "COM"; "NET"; "ORG"; and the like. Each TLD supports second-level domains, listed immediately to the left of the TLD, e.g., the "example" level in "www.example.com". Each second-level domain can include a number of third-level domains located immediately to the left of the second-level domain, e.g. the "www" level in www.example.com.

Generally, new domain names can be registered by a user if the domain name is not already owned. However, a user may attempt to register a desirable domain name, only to discover that the domain name has already been registered by someone else and is no longer available. Thus, a user may have to submit several domain name registration requests before finding a domain name that is available, costing the user's time, processing resources of the user's devices, processing resources of a database of domain name information (e.g., a domain name registry) that the user queries to determine availability, and network and processing resources of devices that facilitate communication between the user and the database.

Generally, there may be suitable alternative domain names that are unregistered and available, but of which the user is unaware. Accordingly, devices processes are needed for effectively identifying and communicating suitable alternatives to domain name registration users without causing excessive costs to the user's time and the system's resources.

SUMMARY

The present disclosure relates to methods, systems, devices, and computer-readable media for generating domain name suggestions by receiving an input string via a user interface, determining an alternative of the input string, determining affixes of the input string, determining top level domains associated with the input string, determining registration availability of domain names including one-step string sequences from the input string based on the alternative input string, the affixes of the input string, and the top level domains associated with the input string, and generating a display for the user interface, where the display includes: the input string, the alternative of the input string, the affixes of the input string, and the top level domains associated with the input string; and indications of the registration availability of the domains names including the one-step string sequences.

In some embodiments, generating domain name suggestions can further include tokenizing the input string into keywords, where determining the alternative of the input string includes determining an alternative for each keyword.

In further embodiments, generating domain name suggestions can further include receiving an initial top level domain, where determining the availability of the domain names includes determining availability of a domain name including the input string and the initial top level domain, and the display further includes an indication of the availability of the domain name.

In other embodiments, generating domain name suggestions can further include receiving, via the user interface, a selection of a one-step string sequence of the one-step string sequences, setting the selection as a new input string, tokenizing the new input string into keywords, determining an alternative for each keyword, determining affixes of the new input string, determining top level domains associated with the new input string, determining registration availability of second domain names including second one-step string sequences from the new input string based on the alternatives of the keywords, the affixes of the new input string, and the top level domains associated with the new input string, and generating a second display for the user interface, where the second display includes: the new input string, the alternatives of the plurality of keywords, the affixes of the new input string, and the top level domains associated with the new input string; and indications of the registration availability of the second domains names including the second one-step string sequences.

In some implementations, generating domain name suggestions can further include receiving an initial top level domain, where determining the availability of the second domain names includes determining availability of a domain name including the new input string and the initial top level domain; and the second display further includes an indication of the availability of the domain name.

In other implementations, the domain name can be available and the processes can further include receiving an indication, via the user interface, to register the domain name, and navigating the user interface to a webpage to register the domain, where the domain name is registered at a domain name registry.

In further implementations, the input string can be a single character and determining the alternative, determining the affixes, determining the top level domains, determining the availability of the domain names, and generating the display are performed each time a subsequent character is received via the user interface.

In some embodiments, the input string can be multiple characters and determining the alternative, determining the affixes, determining the top level domains, determining the availability of the domain names, and generating the display are performed in response to the input string being entered via the user interface.

BRIEF DESCRIPTION OF THE DRAWINGS

The accompanying drawings, which are incorporated in and constitute a part of this specification, illustrate embodiments of the present teachings and together with the description, serve to explain the principles of the present teachings.

DETAILED DESCRIPTION

Figure 1:
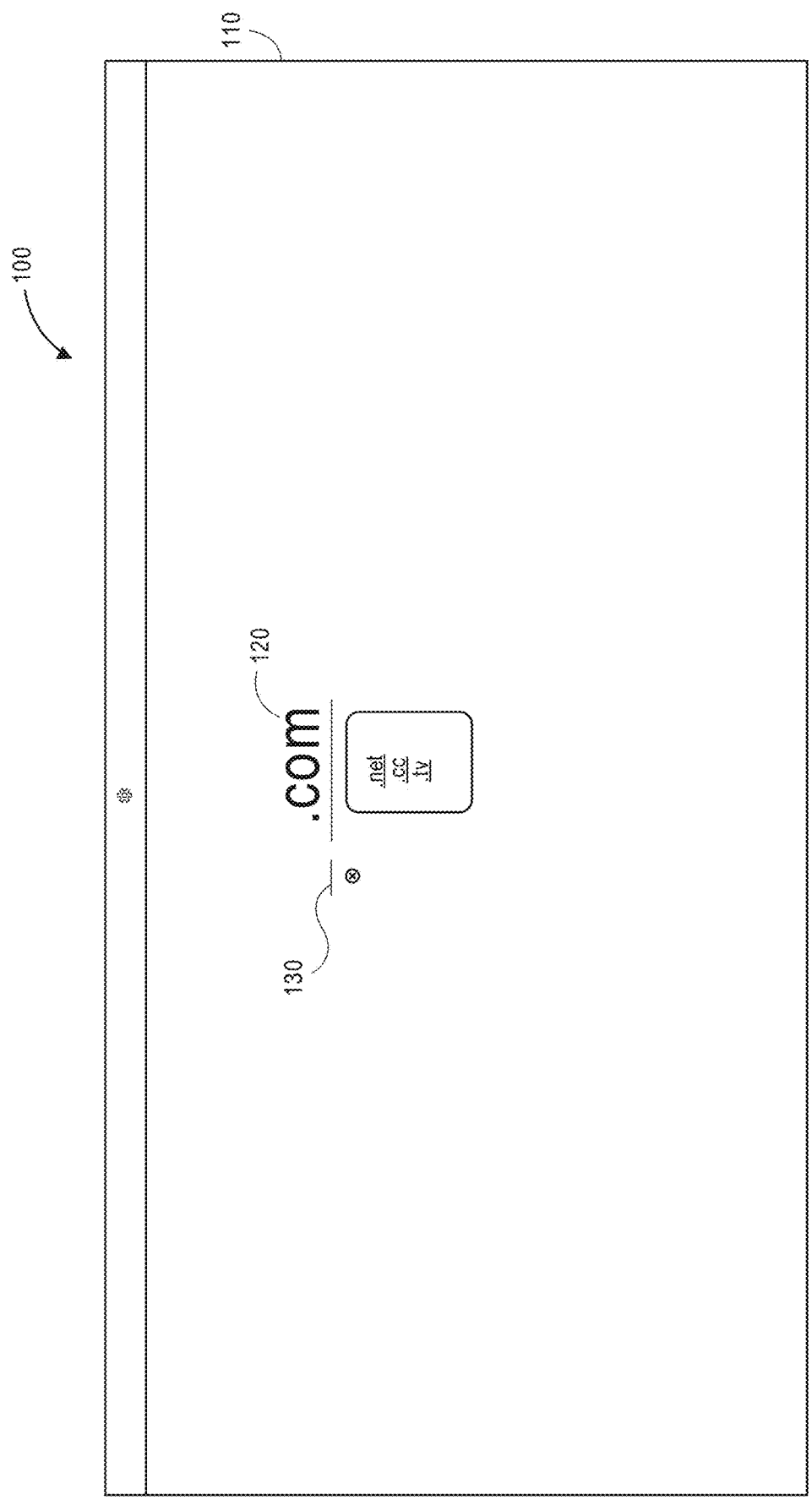
FIG. 1 illustrates an example of a graphical user interface showing a first image in a sequence for domain-name generation, according to an embodiment.

The following detailed description refers to the accompanying drawings. Wherever convenient, the same reference numbers are used in the drawings and the following description to refer to the same or similar parts. While several examples of embodiments and features of the present disclosure are described herein, modifications, adaptations, and other implementations are possible, without departing from the spirit and scope of the present disclosure. Accordingly, the following detailed description does not limit the present disclosure. Instead, the proper scope of the disclosure is defined by the appended claims.

The present disclosure is directed to generating and displaying domain names that are available to be registered in a graphical user interface, which may be thought of as "alternatives" to a domain name that is desired by a user, but is unavailable to be registered. In various implementations, domain name alternatives can be generated by receiving an input string of one or more characters from a user (e.g., the desired domain name), tokenizing the input string into one or more keywords, generating relevant affixes for the one or more keywords, generating relevant keyword alternatives for the one or more keywords, generating TLD alternatives for the one or more keywords, determining one-step string sequences based on generated affixes and alternatives, and determining the availability of domain names corresponding to the one-step string sequences. Using a graphical user interface, as described and shown in the examples herein, indications of available and unavailable domain names corresponding to the one-step string sequences can be displayed to a user. Additionally, the graphical user interface can be dynamically updated (e.g., in real time) based on changes to the input string, selection of a one-step string sequence, changes to a domain name generation setting, and the like.

As used herein, tokenizing can refer to a process of segmenting raw string input into one or more keywords. For example, raw string input can include multiple words as a single string with no spaces, and the process of tokenizing the raw string input can include determining the multiple words within the string and separating the words into multiple keywords.

As further used herein, a one-step string sequence can represent a string sequence that is one change different than an input string. For example, the input string can be from a user (e.g., a domain name desired by the user), and a one-step string sequence can represent one change to the input string, such as a change by adding an affix to a first keyword in the input string or the last keyword in the input string, a change by replacing a keyword with an alternative, or a change by replacing the TLD in the input string. In various implementations, a graphical user interface may display the input string and a one-step string sequence(s), such that if the user selects a displayed representation of a one-step string sequence, the selected one-step string sequence can become the new input string, e.g., as shown or displayed by the graphical user interface.

This disclosure provides a specific, structured graphical user interface that is paired with the described functionality, which is directly related to the graphical user interface's structure, that is addressed to and resolves several technical problems associated with domain name alternatives, such as problems related to displaying limited domain name alternatives, not displaying alternatives in real time, displaying domain name alternatives in a non-user friendly and/or static interface, and the like, which are problems in the prior state of the art. Additionally, this disclosure provides examples of graphical user interfaces that can be used with the larger screen areas of displays for desktop or laptop devices and examples of graphical user interfaces that can be used with the smaller screen areas of mobile device (e.g., smart phone or tablet) displays. The example graphical user interfaces additionally address and resolve problems related to how to efficiently and effectively display domain name alternatives using the available space of a desktop device display or a mobile device display.

FIG. 1 illustrates an example of a graphical user interface 100 showing a first image in a sequence 110, according to an embodiment. The first image in the sequence 110 can, in some embodiments, represent an initial display presented to a user with a default TLD 120 (e.g. .COM, as shown) and a blank input string line 130. The user can select to change the TLD and/or the user can begin entering an input string on the blank input string line 130. In various embodiments, the system may dynamically and sequentially change the images displayed on the graphical user interface 100 (for example, as shown in FIGS. 1-5) in real-time reaction or response to information entered by the user, such as characters or words or the pressing of an enter key. In various implementations, a real-time reaction or response is one that occurs within about 400 milliseconds or less.

Figure 2:
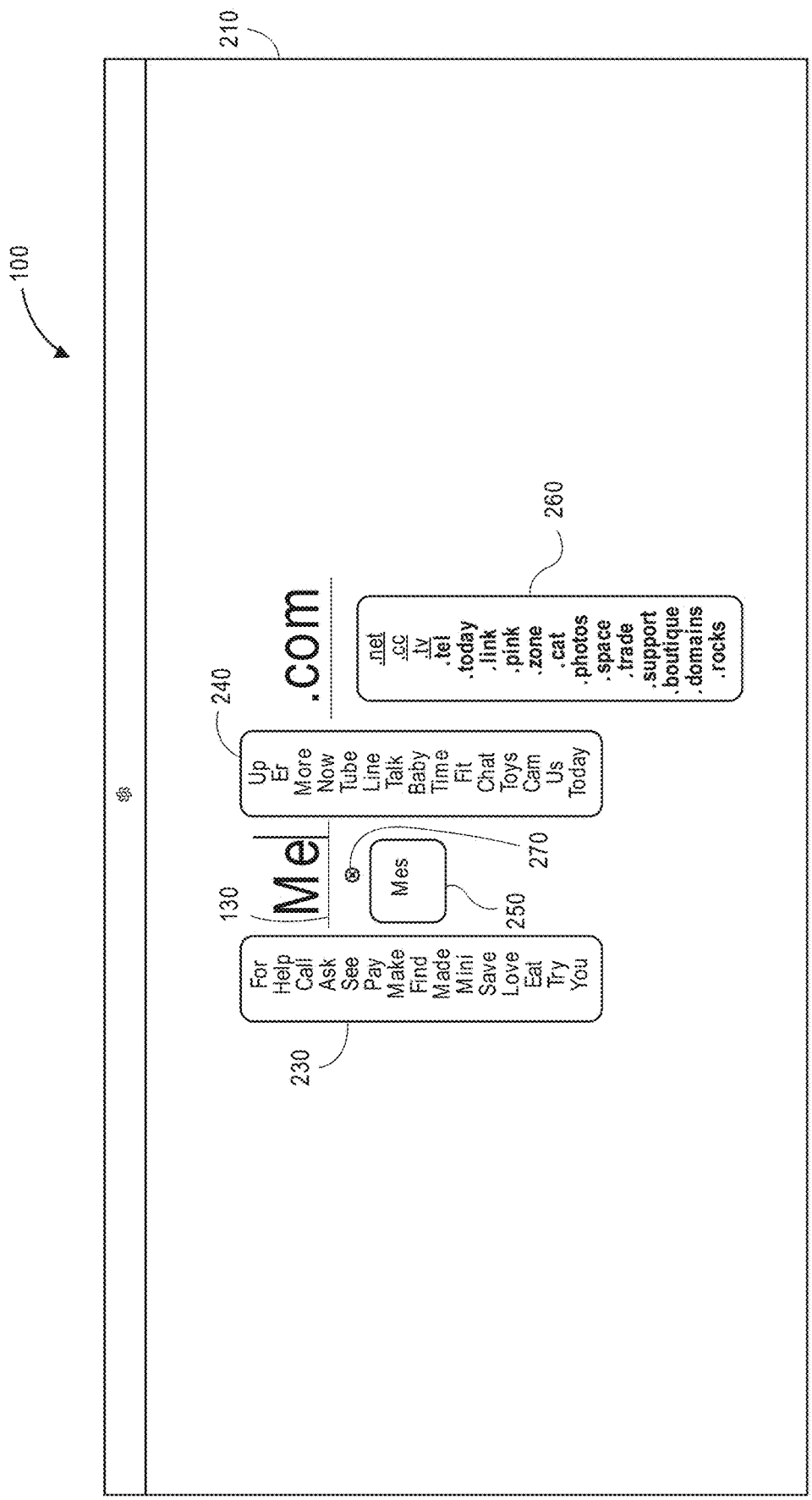
FIG. 2 illustrates an example of a graphical user interface showing a second image in a sequence for domain-name generation, according to an embodiment.

FIG. 2 illustrates an example of the graphical user interface 100 showing a second image in a sequence 210, according to an embodiment. The second image in the sequence 210 can, in some embodiments, represent a dynamically generated display presented to the user after an input string is entered into the input string line 130 (e.g., "ME," as shown in FIG. 2).

The dynamically generated display can include the current string "ME.COM." Additionally, the domain name "ME.COM" may not be available to be registered, which is indicated to the user in an easily recognizable manner, for example, by the lighter color of the text "ME.COM" in the embodiment shown in FIG. 2. In further embodiments, other methods of indicating a domain name is available or not available can include, but are not limited to, using different colors (e.g., gray for unavailable domain names and green for available domain names), underlining available domain names, or other like visual indicators. Some implementations may also include aural indicators.

The dynamically generated display can also include suggested affixes (e.g., zero or more prefixes 230 and/or suffixes 240) to the keyword, alternatives to the keyword 250, and alternatives to the TLD 260.

As shown in the example in FIG. 2, the prefixes 230 are displayed before the keyword with an indication of whether each the prefixes 230 are available for registration. In the example shown, none of the one-step string sequences using the prefixes 230 are available for registration, as indicated in this example by their light color and the dashed outline of their letters. In other words, the graphical user interface 100 indicates that the domain names "FORME.COM," "HELPME.COM," "CALLME.COM," etc. are not available.

As also shown in the example in FIG. 2, the suffixes 240 are displayed after the keyword with an indication of whether each the suffixes 240 are available for registration. In the example shown using light color and dashed letter outline indicators, none of the one-step string sequences using the suffixes 240 are available for registration. For example, the domain name "MEUP.COM" is not available.

As further shown in the example in FIG. 2, zero or more suggested alternative to the keyword is displayed under the keyword and is not available for registration. In this example, on alternative, "MES," is displayed under the keyword but is not available for registration as indicated by the color and outline of the letters.

As additionally shown in the example in FIG. 2, the alternatives to the TLD 260 are displayed under the TLD in the current string using availability indicator(s). In this example, some of the one-step string sequences using the alternative TLDs are available for registration as domain names, such as "ME.TEL," "ME.TODAY," "ME.LINK," etc. This availability for registration is indicated by the bolder/darker color of the letters/text in the example of FIG. 2, but can be indicated using other techniques, as described above.

As also shown in the example in FIG. 2, a remove keyword button 270 is displayed under the keyword. If the user selects the remove keyword button 270, the corresponding keyword can be removed from the current string, and the dynamically generated display can be updated to show affixes, alternatives, etc. determined based on a current string that does not include the removed keyword. In the example shown in FIG. 2, "ME" is the only keyword in the current string, so if the remove keyword button was selected, the dynamically generated display may return to the initial display, as shown in FIG. 1.

Figure 3:
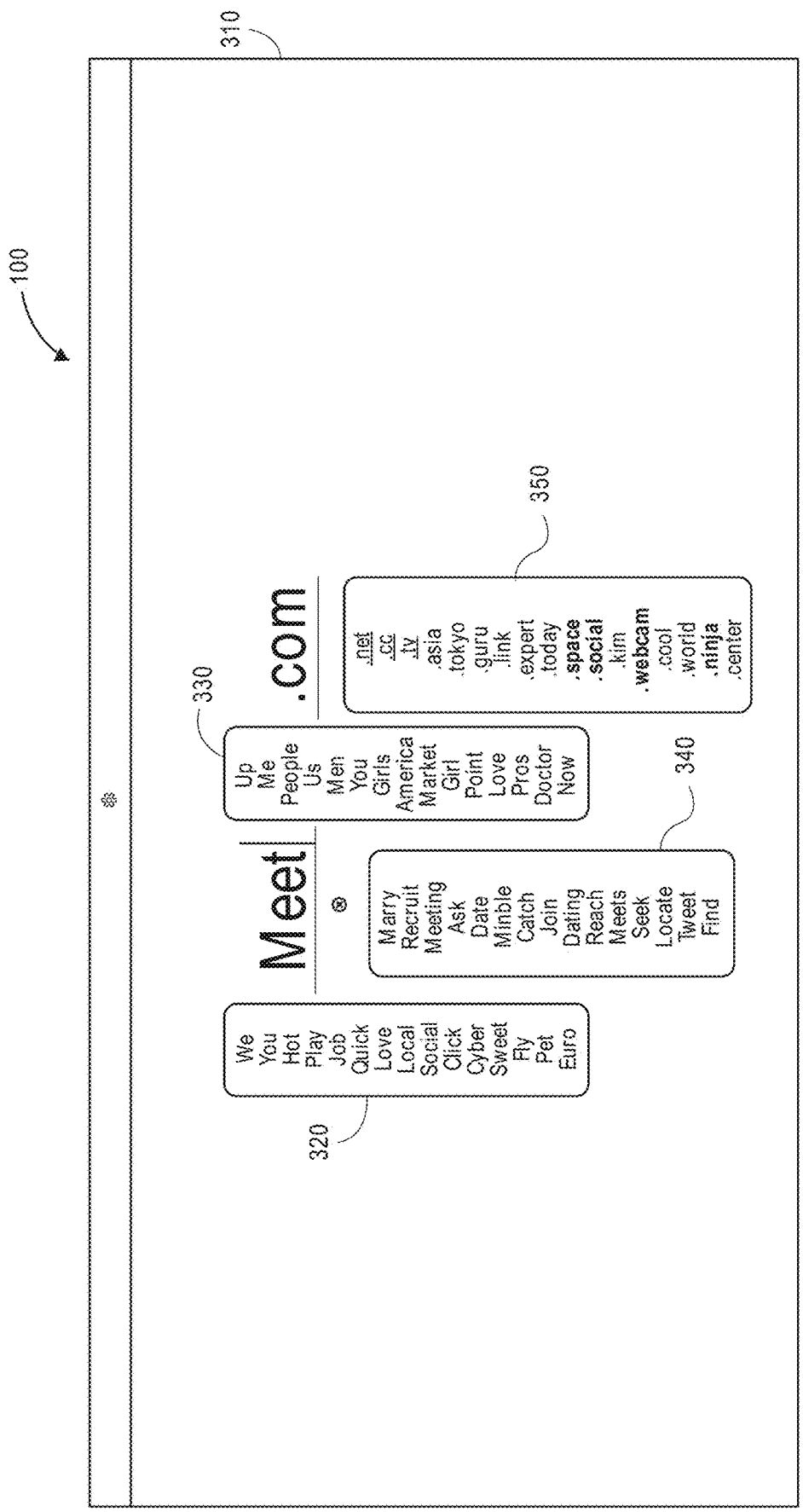
FIG. 3 illustrates an example of a graphical user interface showing a third image in a sequence for domain-name generation, according to an embodiment

FIG. 3 illustrates an example of the graphical user interface 100 showing a third image in a sequence 310, according to an embodiment. The third image in the sequence 310 can, in some embodiments, represent a dynamically generated display presented to the user after the user adds additional characters to the input string (e.g., adding "ET" after "ME" to make the input string "MEET," as shown).

The dynamically generated display can include the current string "MEET.COM." Additionally, the domain name "MEET.COM" may not be available to be registered, as is indicated in this example by the light color and dashed outlines of the letters displayed in "MEET.COM."

The dynamically generated display shown can also include zero or more suggested affixes (e.g., prefixes 320 and suffixes 330) to the keyword, zero or more alternatives to the keyword 340, and zero or more alternatives to the TLD 350, similar to the example shown in FIG. 2. However, the affixes and alternatives can be determined based on the new keyword MEET, instead of the keyword ME as shown in FIG. 2, in reaction to the user entering the additional characters "ET" to form "MEET." Accordingly, the affixes and alternatives are different than the affixes and alternatives shown in FIG. 2.

Figure 4:
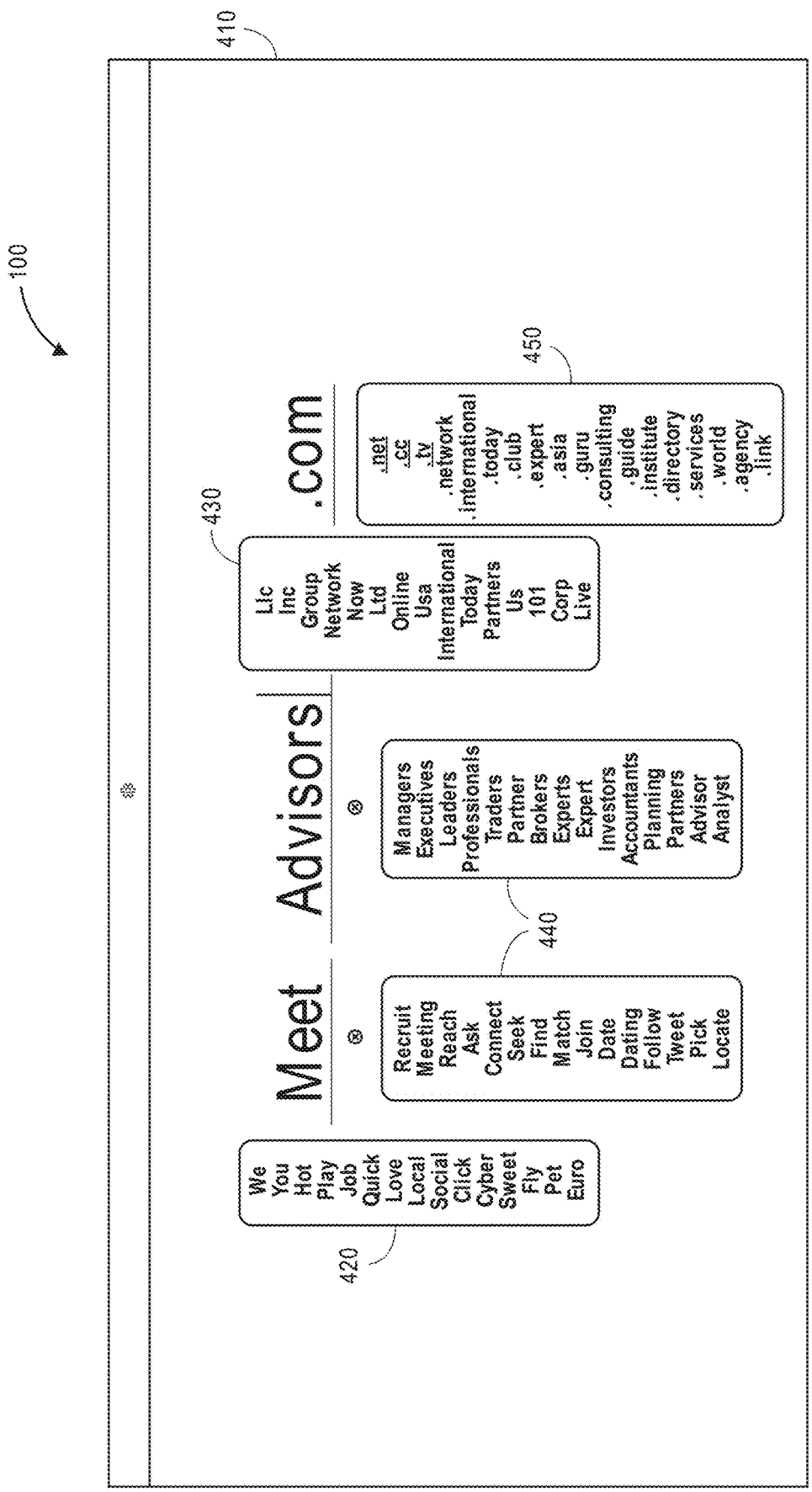
FIG. 4 illustrates an example of a graphical user interface showing a fourth image in a sequence for domain-name generation, according to an embodiment.

FIG. 4 illustrates an example of the graphical user interface 100 showing a fourth image in a sequence 410, according to an embodiment. The fourth image in the sequence 410 can, in some embodiments, represent a dynamically generated display presented to the user after the user adds additional characters to the input string (e.g., "MEETADVISORS," as shown).

The dynamically generated display can include the current string "MEETADVISORS.COM." Additionally, the domain name "MEETADVISORS.COM" may not be available to be registered.

As in the example shown in FIG. 4, the input string can include two keywords "MEET" and "ADVISORS." Accordingly, the system may recognize that the input string contains two keywords and cause the dynamically generated display to display the two keywords separately, even if they are entered as a single string or word by the user. Similarly, the system may analyze an input string to recognize that the input string contains three or more keywords and may cause the dynamically generated display to display the three or more keywords separately.

The dynamically generated display can also include prefixes to the first keyword 420, suffixes to the second keyword 430, alternatives to either or both keywords 440, and alternatives to the TLD 450. In other implementations, the system may also generate and display possible suggested affixes (not shown) between the keywords "MEET" and "ADVISORS."

As shown in the example in FIG. 4, the alternatives to the keyword "MEET" can include the alternative keyword "FOLLOW," which represents the one-step string sequence "FOLLOWADVISORS.COM." As further shown in the example in FIG. 4, the "FOLLOWADVISORS.COM" domain name is available for registration.

If the user clicks on the bolded word "FOLLOW," as shown in FIG. 4, the graphical user interface 100 can proceed to a fifth image in the sequence 510.

In other embodiments, the alternatives to the keywords 440 can be displayed within a list that allows a user to spin through the list by using a vertically swiping motion (e.g., with the mouse or with a finger on a touchscreen). In such embodiments, when the user vertically swipes the list, a three-dimensional effect can be used to spin the alternative keywords in the display, allowing the user to browse through the possibilities before making a selection.

Figure 5:
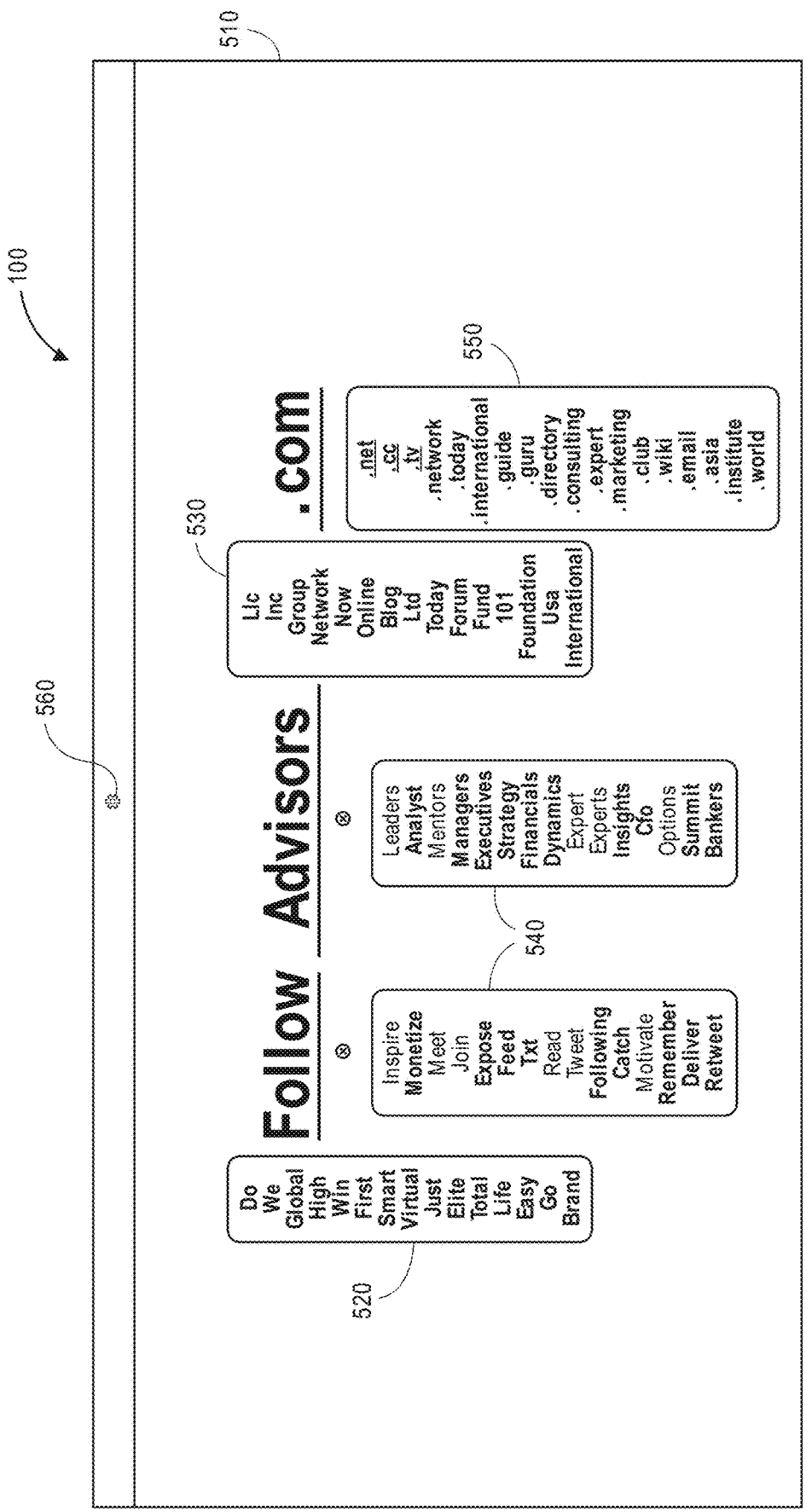
FIG. 5 illustrates an example of a graphical user interface showing a fifth image in a sequence for domain-name generation, according to an embodiment.

FIG. 5 illustrates an example of a graphical user interface 100 showing the fifth image in the sequence 510, according to an embodiment. The fifth image in the sequence can, in some embodiments, represent a dynamically generated display presented to the user after the user clicks the word "FOLLOW," as described above.

The dynamically generated display can include the current string "FOLLOWADVISORS.COM." Additionally, the domain name "FOLLOWADVISORS.COM" may be available to be registered, as shown or indicated by the bolded letters.

In the example shown in FIG. 5, the input string can include two keywords "FOLLOW" and "ADVISORS." Accordingly, the dynamically generated display can display the two keywords separately.

The dynamically generated display can also include prefixes to the first keyword 520, suffixes to the second keyword 530, alternatives to both keywords 540, and alternatives to the TLD 550.

As shown in the examples in FIGS. 1-5, a settings button 560 can be presented in the graphical user interface 100. In the examples shown in FIGS. 1-5, the settings button 560 is indicated by a picture of a gear and is at the top of the display. However, in other embodiments, other indications and placements of the settings button 560 can be used.

In this example, while the dynamically generated display shown in FIG. 5 is presented, if the user clicks on the settings button 560, the graphical user interface 100 can proceed to a sixth image in the sequence 610.

Figure 6:
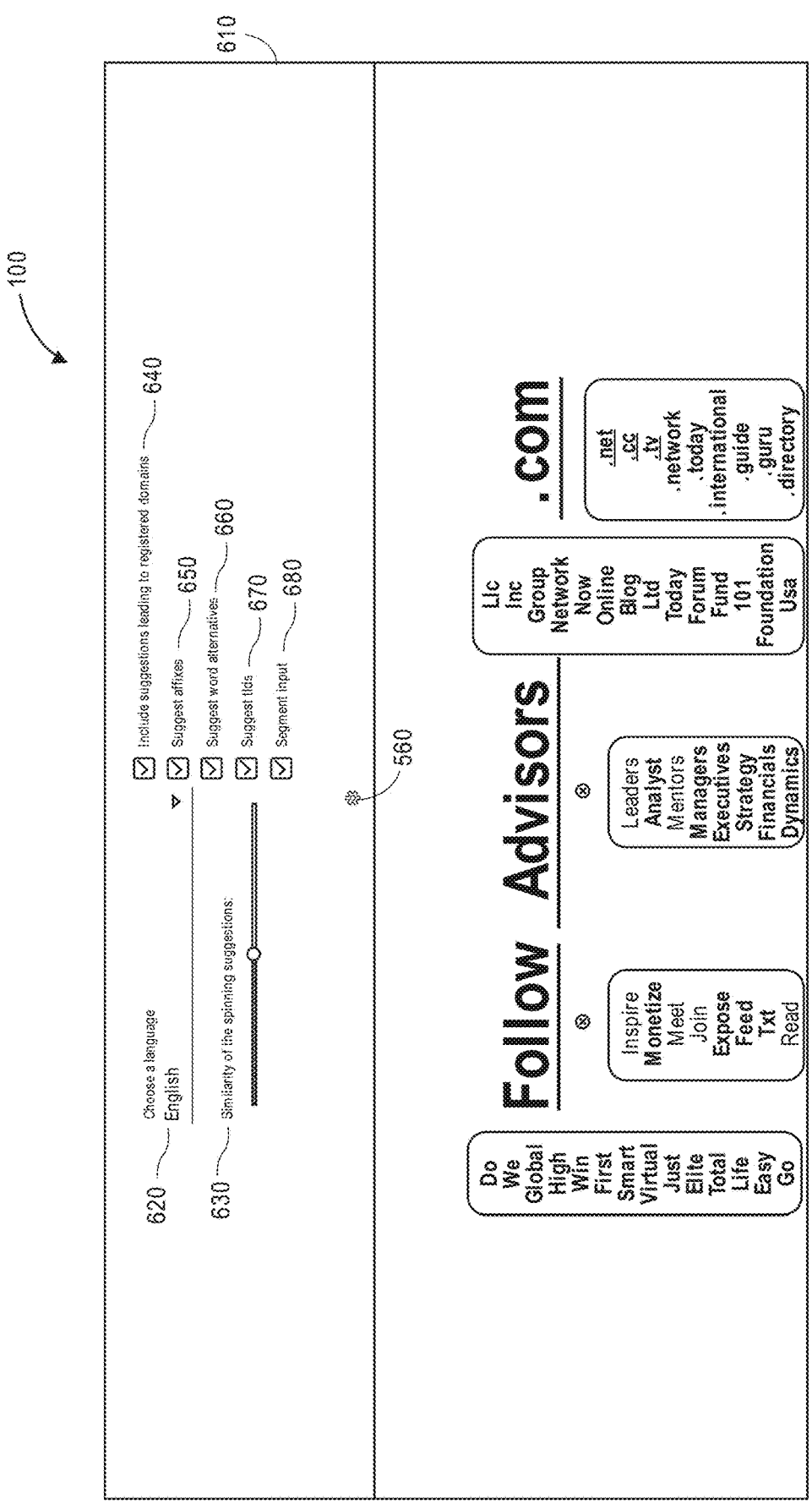
FIG. 6 illustrates an example of a graphical user interface showing a sixth image for domain-name generation, according to an embodiment.

FIG. 6 illustrates an example of the graphical user interface 100 showing the sixth image in the sequence 610, according to an embodiment. The sixth image in the sequence 610 can, in some embodiments, represent a dynamically generated display presented to the user after the user clicks the settings button 560, as described above.

The dynamically generated display can include a "choose a language" selection box 620 that allows the user to select a language of domain name generation (e.g. English, Spanish, French, etc.). If the user selects a different language from a currently selected language, the dynamically generated display can update to include affixes and alternatives that correspond to the newly selected language.

The dynamically generated display can include a "similarity of spinning suggestions" slider selector 630 that allows the user to select a value corresponding to the similarity of suggestions in the affixes and alternatives. For example, the higher this value is, the closer the suggestions will be to the initial input. This can correspond to the cosine distance in the continuous vector space generated by the projection layer of a neural network language model trained on domain name data.

The dynamically generated display can include an "include suggestions leading to registered domains" checkbox 640 that allows the user to select to display only available domain names or to display available and unavailable domain names.

The dynamically generated display can include a "suggest affixes" checkbox 650 that allows the user to select whether to display affixes in the dynamically generated display.

The dynamically generated display can include a "suggest word alternatives" checkbox 660 that allows the user to select whether to display alternative keywords in the dynamically generated display.

The dynamically generated display can include a "suggest TLDs" checkbox 670 that allows the user to select whether to display alternative TLDs in the dynamically generated display.

The dynamically generated display can include a "segment input" checkbox 680 that allows the user to select whether to separate the input string into keywords or to use the entire input string as one keyword.

As noted previously, the user may click on the settings button 560 anytime it is displayed (e.g., in FIGS. 1-5) to produce a display similar to that shown in FIG. 6.

Figure 7:
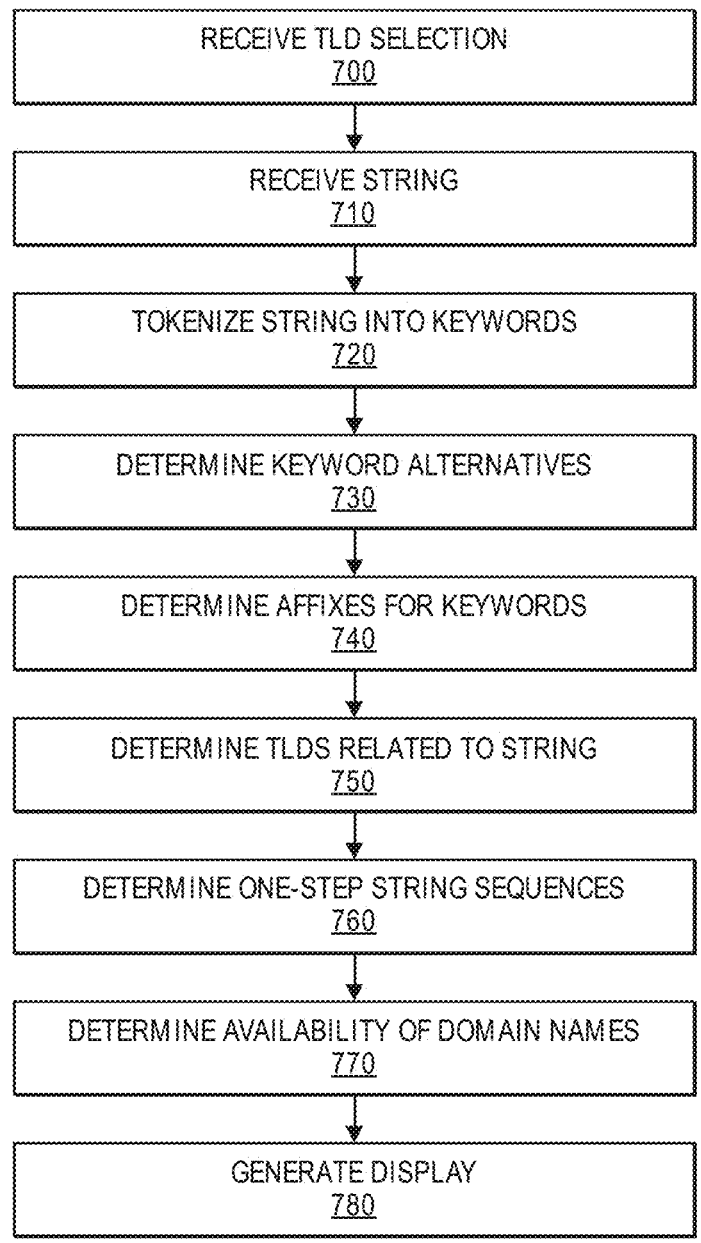
FIG. 7 illustrates an example of a process for generating and displaying domain names that are available, according to an embodiment.

FIG. 7 illustrates an example of a process for generating and displaying domain name alternatives, according to an embodiment. In some embodiments, all or part of the example of a process can be performed by a computing device of a user who is attempting to find or determine available domain names and/or attempting to register a domain name (e.g., via a web browser application on a desktop device or a mobile device, via a mobile device application, etc.). In further embodiments, all or part of the example of a process can be performed by a computer device, such as a web server that has access to and/or maintains one or more databases of domain name information (e.g., a domain name registry or a domain name registrar).

The process can begin in 700 when the computing device receives a TLD selection, for example from the user. In some embodiments, the TLD selection can be based on a default TLD displayed in the graphical user interface presented to the user (e.g., .COM, as shown in FIG. 1). In other embodiments, the user may select from a displayed list of TLDs.

In 710, the computing device can receive a current string. In some embodiments, the input string can include string input by the user via a user interface. The input string can be one or more characters, and can represent the input string being processed in 720-780. In various embodiments, 720-780, described below, can be performed for each input string that is received from the user. In some embodiments, an input string can be received from the user each time the user enters a character. In other words, if the user enters the input string "MEET" one character at a time, 720-780 can be performed four times. 720-780 can first be performed for the input string "M," then for the input string "ME," then for the input string "MEE," and then for the input string "MEET." In other embodiments, an input string can be received from the user each time the user enters new characters and then enters an end-of-string indicator, trigger signal, or character, for example, by pressing the enter key or the space key on a keyboard, clicking a search button using a mouse icon or a touchscreen, and the like. In various embodiments, an input string can also be received from the user when the user pastes a string into the user interface.

In other embodiments and/or in subsequent iterations of 700-780, the input string can be a one-step string sequence selected by the user that then becomes the new input string. In further embodiments and/or in subsequent iterations, the input string can be the result of deleting one or more keywords or characters from the previous input string or from dragging and dropping (e.g., pasting) keywords into different positions within the input string.

In 720, the computing device can tokenize the input string into one or more keywords (for example, as shown in FIG. 4). For example, the computing device can tokenize the input string using natural language processing algorithms and string tokenizers known in the relevant art.

In further embodiments, the input string can be tokenized, at least partially, by the user using an indicator, such as the space key, the mouse cursor, the touchscreen, and the like.

In still further embodiments, the computing device can tokenize the input string based on recognized personal names.

In 730, the computing device can determine alternatives to one or more of the keyword(s) (for instance, as shown in FIG. 4). For example, the computing device can determine synonyms and other related words for each keyword using natural language toolkits known in the art and/or machine learning algorithms trained using domain name registration data. In some embodiments, the computing device can determine alternatives using the systems and methods described in: U.S. patent application Ser. No. 13/048,340, entitled, "LOCALIZED AND CUTURAL DOMAIN NAME SUGGESTIONS" filed Mar. 15, 2011 and/or U.S. Pat. No. 8,768,935, entitled, "BIGRAM SUGGESTIONS" filed Oct. 10, 2011, the entireties of which is hereby incorporated by reference.

In 740, the computing device can determine affixes for one or more keywords in the input string. In some embodiments, one or more prefixes can be determined for the first keyword in the input string and one or more suffixes can be determined for the last keyword (or the same (first) keyword) in the input string, for example as shown in FIG. 4. In other embodiments, affixes can additionally be determined between keywords in the input string (i.e., an infix). The computing device can determine affixes using, for example, natural language toolkits known in the art and/or machine learning algorithms trained using domain name registration data. In some embodiments, the computing device can determine affixes using the systems and methods described in: U.S. Pat. No. 9,065,794, entitled, "SYSTEMS AND METHODS FOR PROVIDING DOMAIN NAME SUGGESTIONS" filed Nov. 21, 2012, the entirety of which is hereby incorporated by reference.

In 750, the computing device can determine one or more TLDs related to the current string. For example, the computing device can determine TLDs by accessing a predetermined list of known TLDs and identifying TLDs that are similar to synonyms and other related words for keywords in the input string using natural language toolkits known in the art and/or machine learning algorithms trained using domain name registration data.

In 760, the computing device can determine one or more one-step string sequences using the determined alternative keywords, affixes, and TLDs. For example, each affix can be individually added to the input string and the input string plus the affix can represent a single one-step string sequence, In 770, the computing device can determine the availability of one or more domain names corresponding to each of the one-step string sequences by accessing a database of domain name registration information. For example, the computing device can be or have access to a device that maintains domain name registry information. Accordingly, the computing device can generate a query associated with each one-step string sequence to determine if the one-step string sequence is associated with an available domain name.

In 780, the computing device can generate a display for the user interface that includes the input string, tokenized keywords, the TLD, the alternative keywords, the alternative TLDS, the affixes, and/or indications of domain name availability corresponding to the current input and/or to one-step string sequences based on the alternative keywords, the alternative TLDs, and the affixes. In various embodiments, some or all of these elements may be fully or partially hidden from view in the display. For example, the display may allow the user to hide one or more of these elements (e.g., the user can hide alternative keywords for one or more of the keywords by pressing a hide suggestions button). As a further example, one or more of these elements may be initially hidden from view to conserve screen space (e.g., for the smaller display of a mobile device), and the user can select to unhide one or more elements, resulting in their inclusion in the display. As a further example, one or more of these elements may be partially hidden from view to conserve screen space (e.g., only a partial list of alternatives, affixes, etc. may be listed), and the user can scroll through the element to reveal other parts of the element.

In some implementations, using the generated display, the user can select a one-step string sequence by, for example, selecting a suggested affix, selected an alternative keyword, selecting a new TLD, deleting a token, and the like. In other implementations, the user can change the input string by, for example, deleting a keyword, rearranging the positions of the keyword (e.g., using drag and drop functionality, as described below), entering a new input string, and the like.

When the user selects a one-step string sequence and/or changes the current string, the process can proceed back to 710 and a subsequent iteration of 710-780 can be performed.

In various instances, the input string may correspond to an available domain name, and the user can end the process by supplying an indication via the user interface to register the available domain name. Subsequently, the user interface can be navigated to a webpage that allows the user to register the domain name (e.g., a webpage associated with a domain name registry or a domain name registrar), and the domain name can be registered at a domain name registry.

Figure 8:
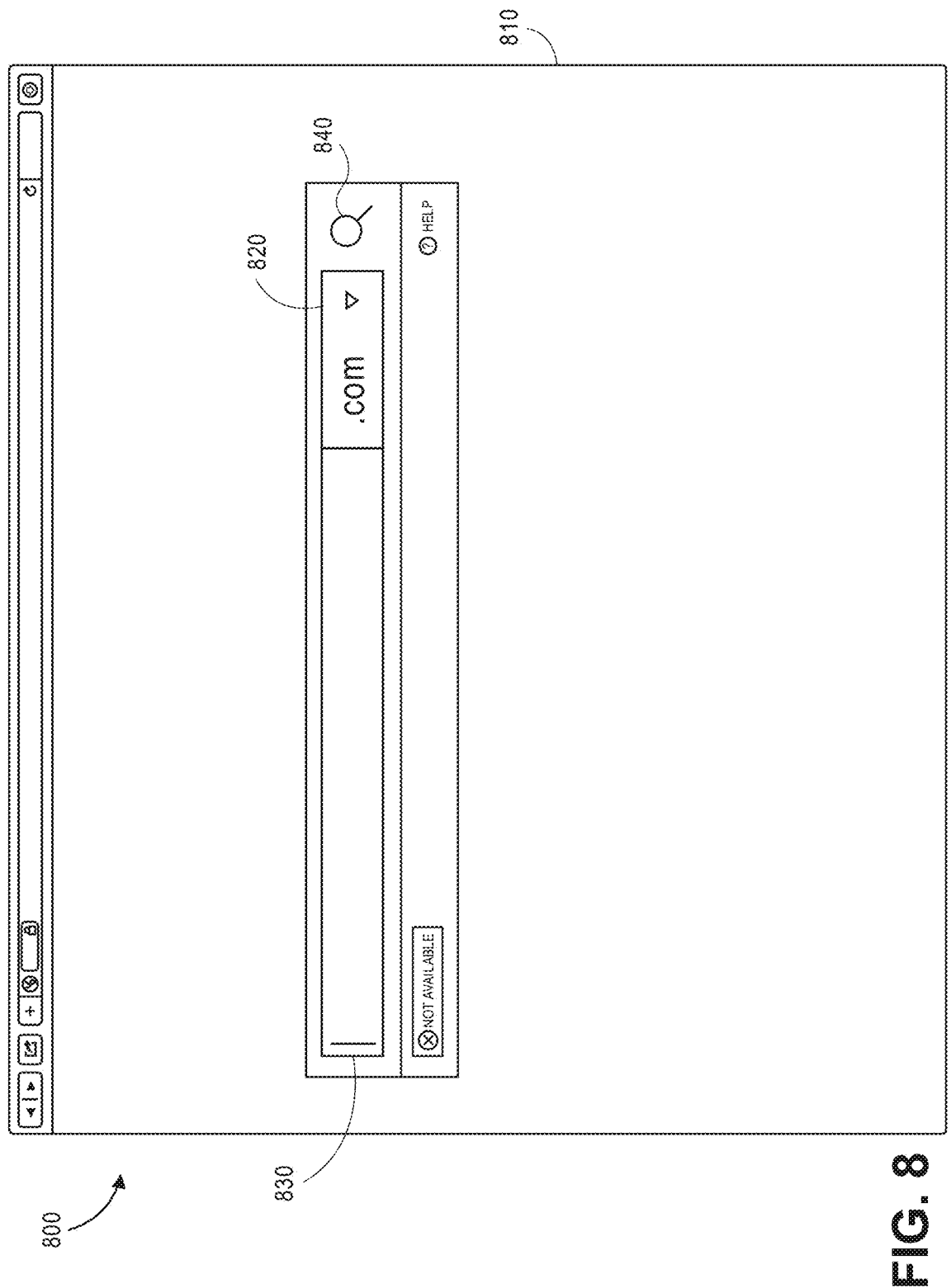
FIG. 8 illustrates an example of a graphical user interface showing a first image in a sequence, according to an embodiment.

FIG. 8 illustrates an example of a graphical user interface 800 showing a first image in a sequence 810, according to an embodiment. The first image in the sequence 810 can, in some embodiments, represent an initial display presented to a user with a default TLD 820 (e.g. .COM, as shown) and an input string box 830. The user can select to change the TLD and/or the user can begin entering an input string on the blank input string line 830. In various embodiments, the system may dynamically and sequentially change the images displayed on the graphical user interface 800 (for example, as shown in FIGS. 8-13) in response to the pressing of an enter key or the use of a mouse cursor to click a search button 840.

Figure 9:
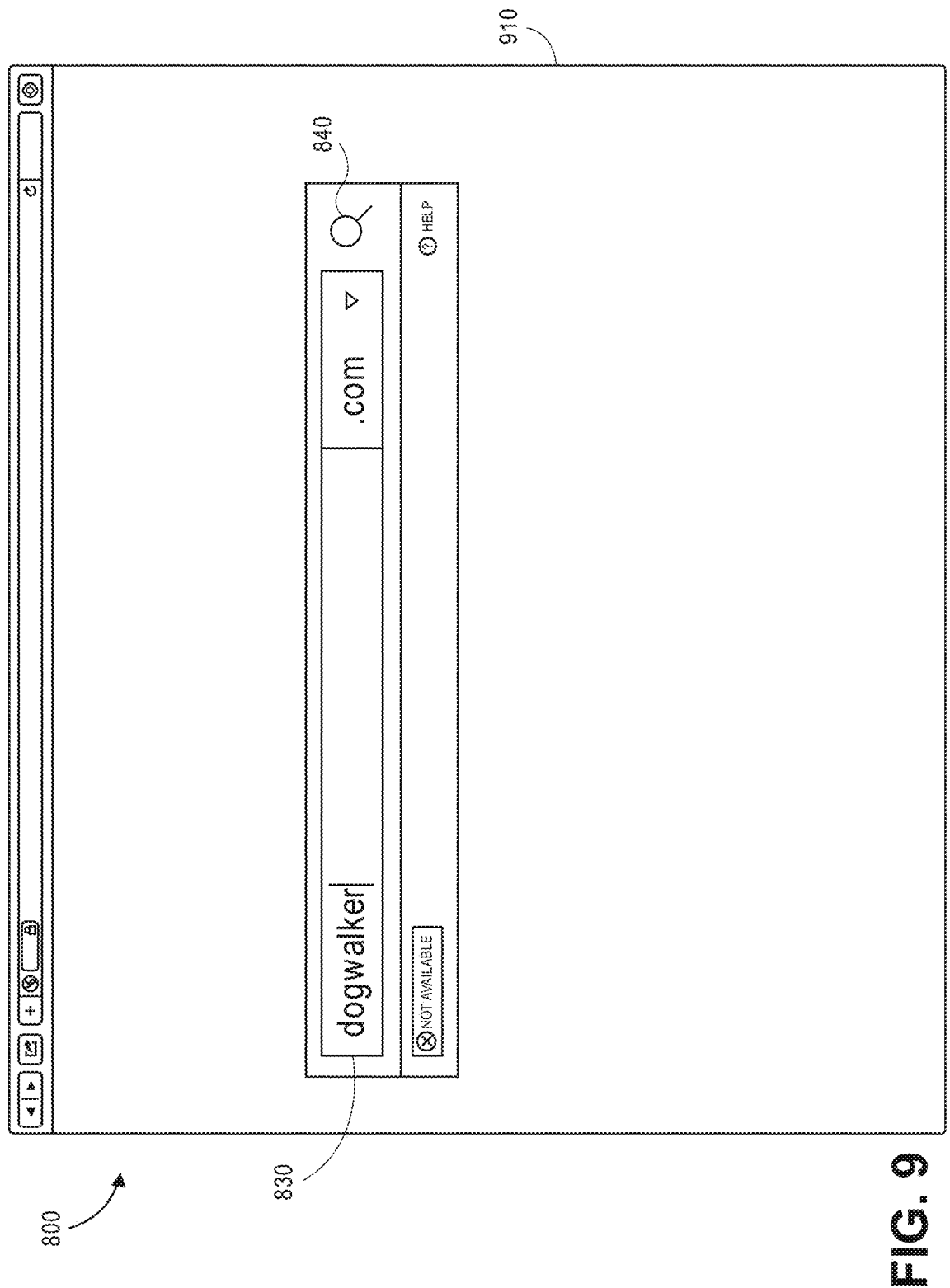
FIG. 9 illustrates an example of a graphical user interface showing a second image in a sequence, according to an embodiment.

FIG. 9 illustrates an example of the graphical user interface 800 showing a second image in a sequence 910, according to an embodiment. The second image in the sequence 910 can, in some embodiments, represent a display presented to a user after an input string is entered in the input string box 830 (e.g., "DOGWALKER" as shown in FIG. 9) and before the user presses the enter key or uses a mouse cursor to click the search button 840. Accordingly, other than the text in the input string box 830, the system may not have changed the images displayed on the graphical user interface 800.

Figure 10:
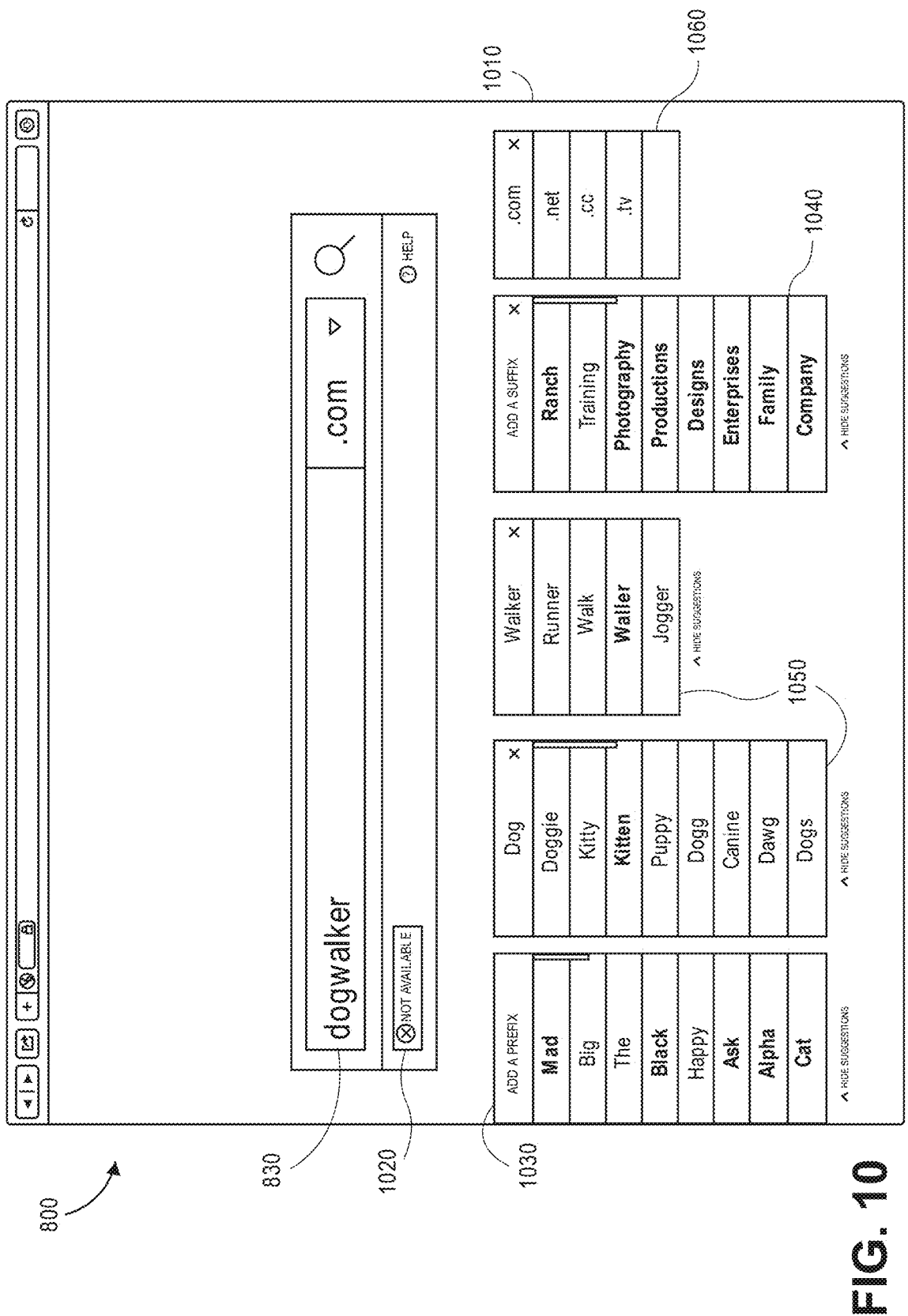
FIG. 10 illustrates an example of a graphical user interface showing a third image in a sequence, according to an embodiment.

FIG. 10 illustrates an example of the graphical user interface 800 showing a third image in a sequence 1010, according to an embodiment. The third image in the sequence 1010 can, in some embodiments, represent a dynamically generated display presented to the user after an input string is entered into the input string box 830 (e.g., "DOGWALKER," as shown in FIG. 10), for example by pressing the enter key or clicking the search button 840.

The dynamically generated display can include the input string "DOGWALKER." Accordingly, "DOGWALKER-.COM" may be the current string. Additionally, the domain name "DOGWALKER.COM" may not be available to be registered, which is indicated by the "not available" indicator 1020 in the embodiment shown in FIG. 10. In further embodiments, other methods of indicating a domain name is available or not available can include, but are not limited to, displaying an error message, displaying an indication that the domain name is available, displaying the current string in a particular color (e.g., green), and the like. Some implementations may also include aural indicators.

In the embodiment shown in FIG. 10, the input string "DOGWALKER" may have been tokenized into two keywords, "DOG" and "WALKER." For example, the input string may be tokenized by recognizing that the input string contains two words that were found in an English dictionary (other languages may be used in various embodiments), recognizing that the input string contains words that are in a predetermined list, and the like.

The dynamically generated display can also include suggested affixes (e.g., prefixes 1030 and suffixes 1040) for the keyword(s), alternatives to the tokens that make up the keyword 1050, and alternatives to the TLD 1060.

As shown in the example in FIG. 10, the prefixes 1030 are displayed before the keywords, e.g., displayed below and starting to the left of the input string box 830. In this example, some of the one-step string sequences using the prefixes 1030 are available for registration as domain names, such as "MADDOGWALKER.COM" and "ALPHADOG-WALKER.COM." In a manner similar to that explained with respect to FIGS. 1-6 above, this is indicated by the bolder/darker color of the text in the example of FIG. 10, but can be indicated using other techniques, as described above. Additionally, some of the one-step string sequences using the prefixes 1030 are not available for registration, as indicated in this example by their light color and the dashed outline of their letters. In this example, the graphical user interface 800 shown indicates that the domain names "BIG-DOGWALKER.COM," "THEDOGWALKER.COM," "HAPPYDOGWALKER.COM," etc. are not available.

As also shown in the example in FIG. 10, the suffixes 1040 are displayed after the keywords e.g., displayed below and toward the right of the input string box 830. In this example, some of the one-step sequences that employ one of the suffixes 1040 are available, such as "DOGWALKER-RANCH.COM" and "DOGWALKERPHOTOGRAPHY-.COM," and one of the one-step sequences that employs one of the suffixes 1040 is not available: "DOGWALKER-TRAINING.COM."

As further shown in the example in FIG. 10, suggested alternatives to the first keyword, "DOG," are displayed under or approximately under the first keyword (e.g., displayed below and toward the left end of the input string box 830) and one is available for registration, "KITTEN-WALKER.COM." Other suggested alternatives to the first keyword, "DOG" are not available, such as "DOG-GIEWALKER.COM" and "KITTYWALKER.COM."

As also shown in the example in FIG. 10, suggested alternatives to the second keyword, "WALKER," are displayed under or approximately under the second keyword (e.g., displayed below and toward the right end of the input string box 830) and one is available for registration, "DOG-WALLER.COM." Other suggested alternatives to the second keyword, "WALKER" are not available, such as "DOG-RUNNER.COM" and "DOGWALK.COM."

As additionally shown in the example in FIG. 10, the alternatives to the TLD 1060 are displayed under or approximately under the TLD from the current string (e.g., displayed below and to the right of the input string box 830). In this example, some of the one-step string sequences using the alternative TLDs 1060 are available for registration as domain names, such as "DOGWALKER.CC" and "DOG-WALKER.TV." One one-step string sequence using an alternative TLD is not available for registration as a domain name: "DOGWALKER.NET."

As also depicted in FIG. 10, the graphical user interface 800 can include an "x" icon in each of the keyword boxes 1050 that contain a current keyword. In some embodiments, if the user clicks the "x" icon, the corresponding keyword can be removed from the graphical user interface 800, the input string displayed in the input string box 830 can be updated by removing the part of the input string that corresponds to the removed keyword, and the availability of the domain name(s) containing the input string and the one-step string sequences can be updated and displayed accordingly.

As further depicted in FIG. 10, the graphical user interface 800 can include an "A" icon below each of the keyword boxes 1050 and the "add a prefix" and the "add a suffix" boxes. In some embodiments, if the user clicks the """ icon the one-step string sequences above the "^" icon can be removed and/or hidden from view in the graphical user interface 800.

Figure 11:
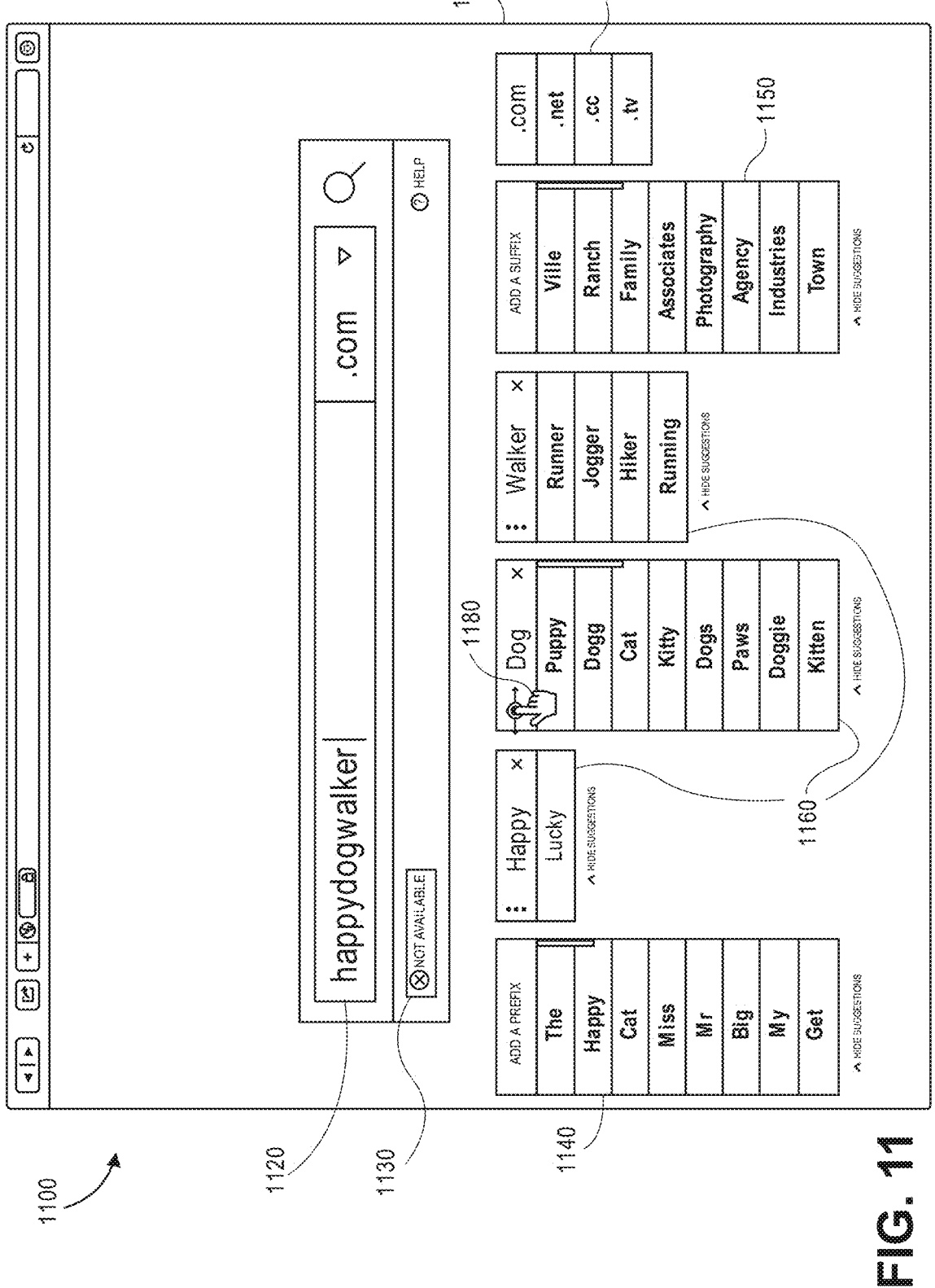
FIG. 11 illustrates an example of a graphical user interface showing a first image in a sequence, according to an embodiment.

FIG. 11 illustrates an example of the graphical user interface 1100 showing a first image in a sequence 1110, according to an embodiment. The first image in the sequence 1110 can, in some embodiments, represent a dynamically generated display presented to the user after an input string is entered into an input string box 1120 (e.g., "HAPPYDOG-WALKER").

The dynamically generated display can include the input string "HAPPYDOGWALKER." Accordingly, "HAPPYDOGWALKER.COM" may be the current string. Additionally, the domain name "HAPPYDOGWALKER.COM" may not be available to be registered, which is indicated by the "not available" indicator 1130 in the embodiment shown in FIG. 11.

In the embodiment shown in FIG. 11, the input string "HAPPYDOGWALKER" may have been tokenized into three keywords, "HAPPY," "DOG," and "WALKER." For example, the input string may be tokenized by recognizing that the input string contains three dictionary words, recognizing that the input string contains words that are in a predetermined list, and the like.

The dynamically generated display can also include suggested affixes (e.g., prefixes 1140 and suffixes 1150) to the keyword(s), alternatives to the keyword(s) 1160, and alternatives to the TLD 1170.

As described above in other embodiments, some of the one-step string sequences using the prefixes 1140, affixes 1150, and alternatives 1160 may be available to register as a domain name, as indicated in this example by the bolder/darker color of the text, and some of the one-step string sequences may not be available, as indicated in this example by their light color and the dashed outline of their letters. For example, the suggested alternative "LUCKY" to the first keyword, "HAPPY" is not available: "LUCKYDOG-WALKER.COM."

As shown in FIG. 11, the keywords may be displayed in boxes that include an icon with three vertical dots. In this example, the "HAPPY" keyword box and the "WALKER" keyword box include this icon. This icon can indicate that the boxes can be dragged and dropped. In other embodiments, different icons can be used to indicate that the boxes can be dragged and dropped or otherwise moved.

As further shown in FIG. 11, the mouse icon 1180 may appear when hovering over the "DOG" keyword box, and the user may be pressing a mouse button, which can result in the three vertical dots icon changing to a horizontal line with a circular icon in the middle. This icon can indicate that the user can now drag and drop the "DOG" keyword box by moving the mouse cursor. In other embodiments, different icons or no icons at all can be used to indicate that the boxes can be dragged and dropped by moving the mouse icon 1180.

Figure 12:
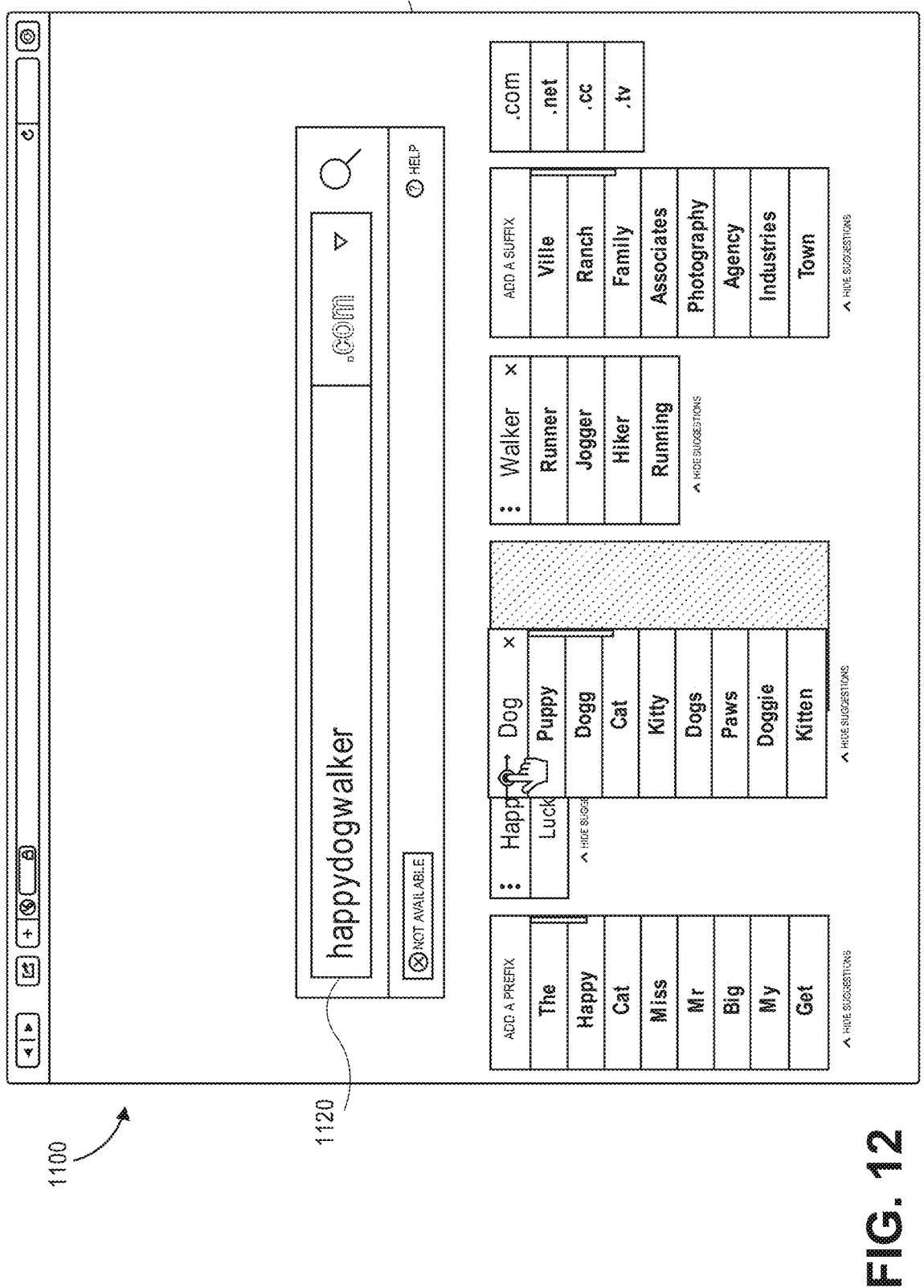
FIG. 12 illustrates an example of a graphical user interface showing a second image in a sequence, according to an embodiment.

FIG. 12 illustrates an example of the graphical user interface 1100 showing a second image in a sequence 1210, according to an embodiment. The second image in the sequence 1210 can, in some embodiments, represent a dynamically generated display presented to the user after an input string is entered into the input string box 1120 (e.g., "HAPPYDOGWALKER") and after the user begins to drag the "DOG" keyword box to the left.

In the embodiment shown in FIG. 12, the keywords and the one-step string sequences have not changed from FIG. 11. This can be because the user is in the process of dragging the "DOG" keyword box to the left over the "HAPPY" keyword box, and has not yet dropped or otherwise sufficiently moved the "DOG" keyword box into a selected location.

Figure 13:
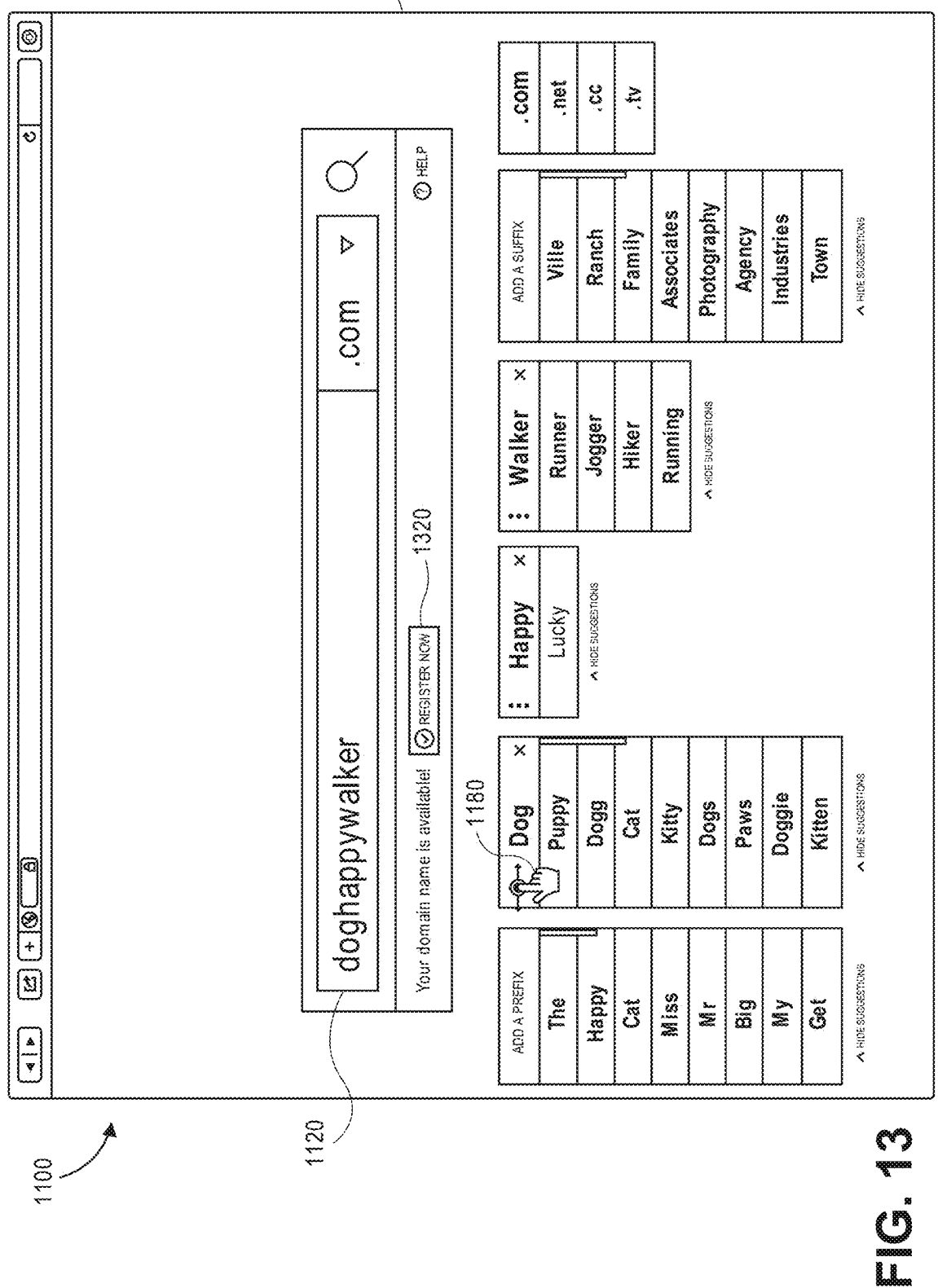
FIG. 13 illustrates an example of a graphical user interface showing a third image in a sequence, according to an embodiment.

FIG. 13 illustrates an example of the graphical user interface 1100 showing a third image in a sequence 1310, according to an embodiment. The third image in the sequence 1310 can, in some embodiments, represent a dynamically generated display presented to the user after the user has placed the "DOG" keyword box into a new location, in this example, to the left of the "HAPPY" keyword box, and/or dropped the "DOG" keyword box into the new location.

In the embodiment shown in FIG. 13, the user may have only dragged the "DOG" keyword box into the new location by holding down a mouse button and moving the mouse icon 1180. This is indicated by the icon in the "DOG" keyword box remaining as the horizontal line with the circular icon in the middle. In other embodiments, different icons or no icons at all can be used to indicate that the boxes can be dragged and dropped by moving the mouse icon 1180. Based on moving the "DOG" keyword box to the new location, the new keyword is "DOGHAPPYWALKER," as shown in the input string box 1120, and the domain name "DOGHAPPYWALKER.COM" may be available to be registered as a domain name, which is indicated by the "register now" indicator 1320 in the embodiment shown in FIG. 13.

Additionally, based on moving the "DOG" keyword box to the new location, the one-step string sequences may be updated from the one-step string sequences shown in FIGS. 11-12. For example, the alternative "LUCKY" under the "HAPPY" keyword box now indicates that the one-step string sequence is available, when the alternative "LUCKY" was not available in FIGS. 11-12. This can be because the domain name "LUCKYDOGWALKER.COM" may be not available, while the domain name "DOGLUCKYWALKER" is available.

In some embodiments, the availability of the current string and the one-step string sequences may be updated simply by moving the keyword box to the new location, while, in other embodiments, the availabilities may not be updated until the user drops the keyword box into place by releasing the mouse button after moving the keyword box to the new location.

FIGS. 11-13 depict the user dragging a keyword box to the left one position. However, in other embodiments, the user may drag the keyword box to the right and/or may drag the keyword box two or more positions. As a result, the availability of the current string and the one-step string sequences can be updated accordingly, similar to the process described above for FIGS. 11-13.

Figure 14:
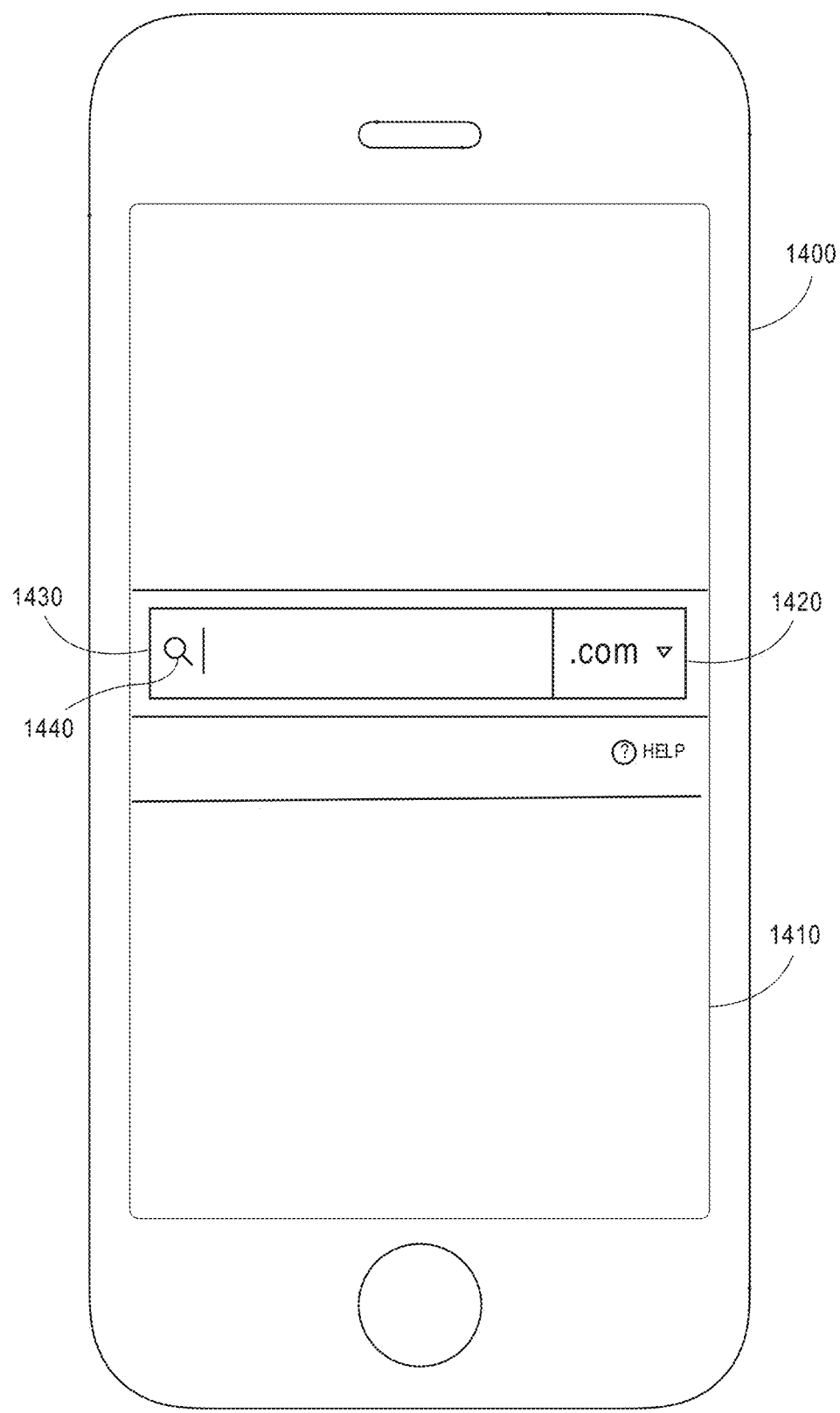
FIG. 14 illustrates an example of a graphical user interface of a mobile device showing a first image in a sequence, according to an embodiment.

FIG. 14 illustrates an example of a graphical user interface of a mobile device 1400 showing a first image in a sequence 1410, according to an embodiment. The first image in the sequence 1410 can, in some embodiments, represent an initial display presented to a user with a default TLD 1420 (e.g. .COM, as shown) and a blank input string box 1430. The user can select to change the TLD and/or the user can begin entering an input string on the input string box 1430 (e.g., using a touchscreen keyboard, voice-to-text, etc.). In various embodiments, the system may dynamically and sequentially change the images displayed on the graphical user interface (for example, as shown in FIGS. 14-26) in response to the user pressing an enter key (e.g., using the touchscreen keyboard) or using a touchscreen to click a search button 1440.

Figure 15:
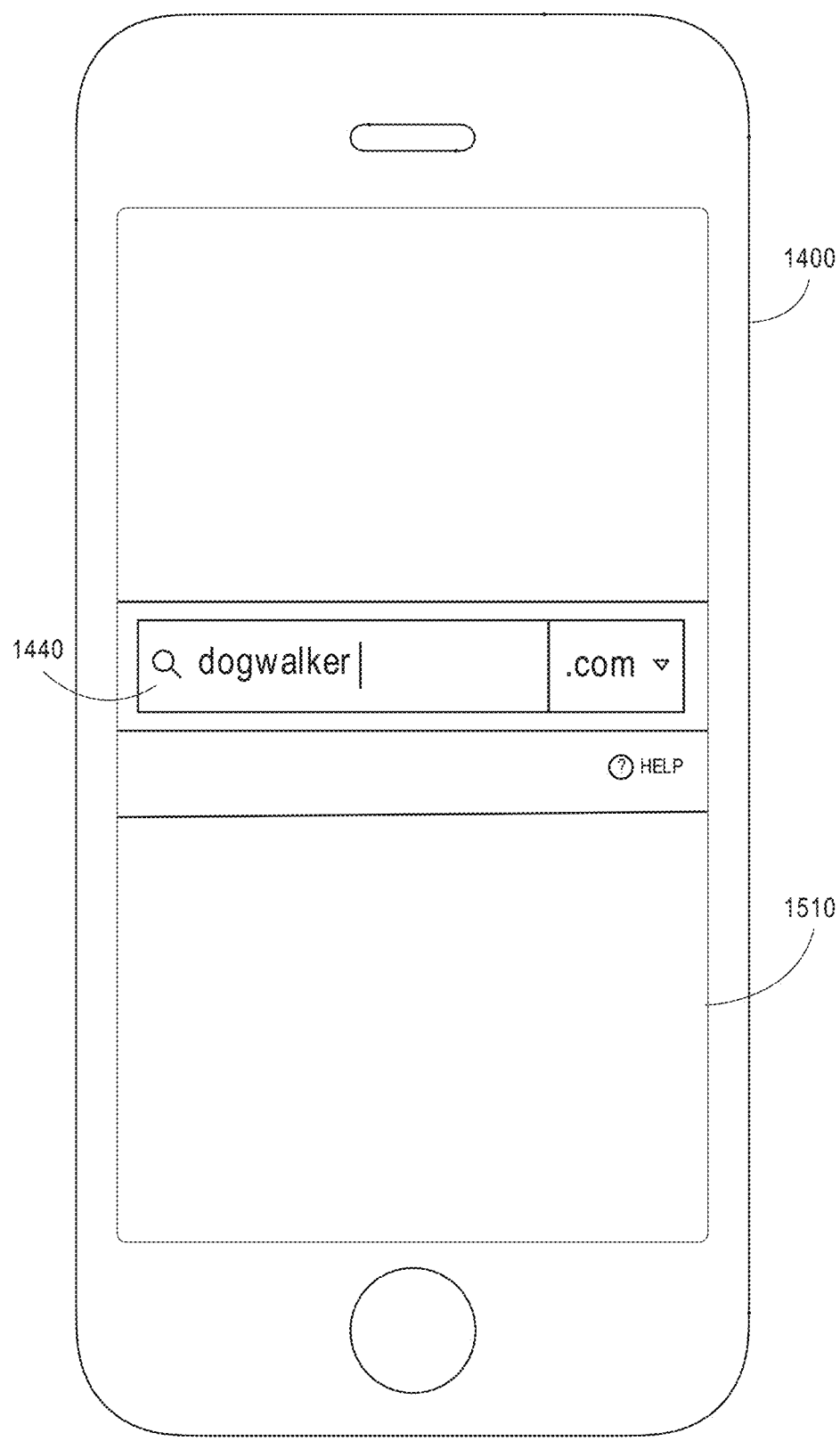
FIG. 15 illustrates an example of a graphical user interface of a mobile device showing a second image in a sequence, according to an embodiment.

FIG. 15 illustrates an example of the graphical user interface of the mobile device 1400 showing a second image in a sequence 1510, according to an embodiment. The second image in the sequence 1510 can, in some embodiments, represent a display presented to a user after an input string is entered and before the user presses the enter key or uses a touchscreen to click the search button 1440. Accordingly, the system may not have changed the images displayed on the graphical user interface.

Figure 16:
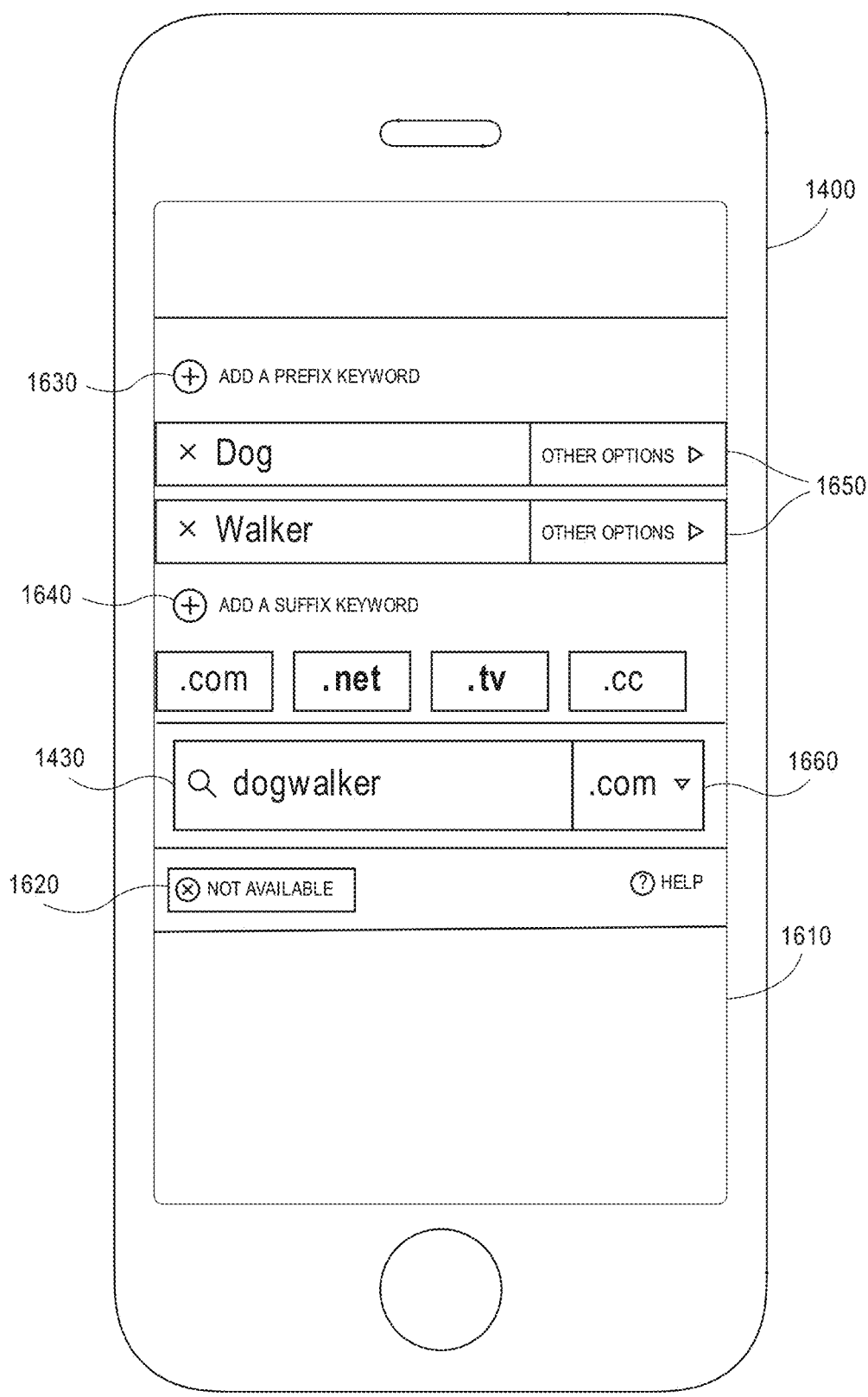
FIG. 16 illustrates an example of a graphical user interface of a mobile device showing a third image in a sequence, according to an embodiment.

FIG. 16 illustrates an example of the graphical user interface of the mobile device 1400 showing a third image in a sequence 1610, according to an embodiment. The third image in the sequence 1610 can, in some embodiments, represent a dynamically generated display presented to the user after an input string is entered into the input string box 1430 (e.g., "DOGWALKER," as shown in FIG. 16).

The dynamically generated display can include the input string "DOGWALKER." Accordingly, "DOGWALKER. COM" may be the current string. Additionally, the domain name "DOGWALKER.COM" may not be available to be registered, which is indicated by the "not available" indicator 1620 in the embodiment shown in FIG. 16. In further embodiments, other methods of indicating a domain name is available or not available can include, but are not limited to, displaying an error message, displaying an indication that the domain name is available, displaying the current string in a particular color (e.g., green), and the like. Some implementations may also include aural indicators.

In the embodiment shown in FIG. 16, the input string "DOGWALKER" has been tokenized into two keywords, "DOG" and "WALKER." For example, the input string may be tokenized by recognizing that the input string contains two dictionary words, recognizing that the input string contains words that are in a predetermined list, and the like.

Figure 21:
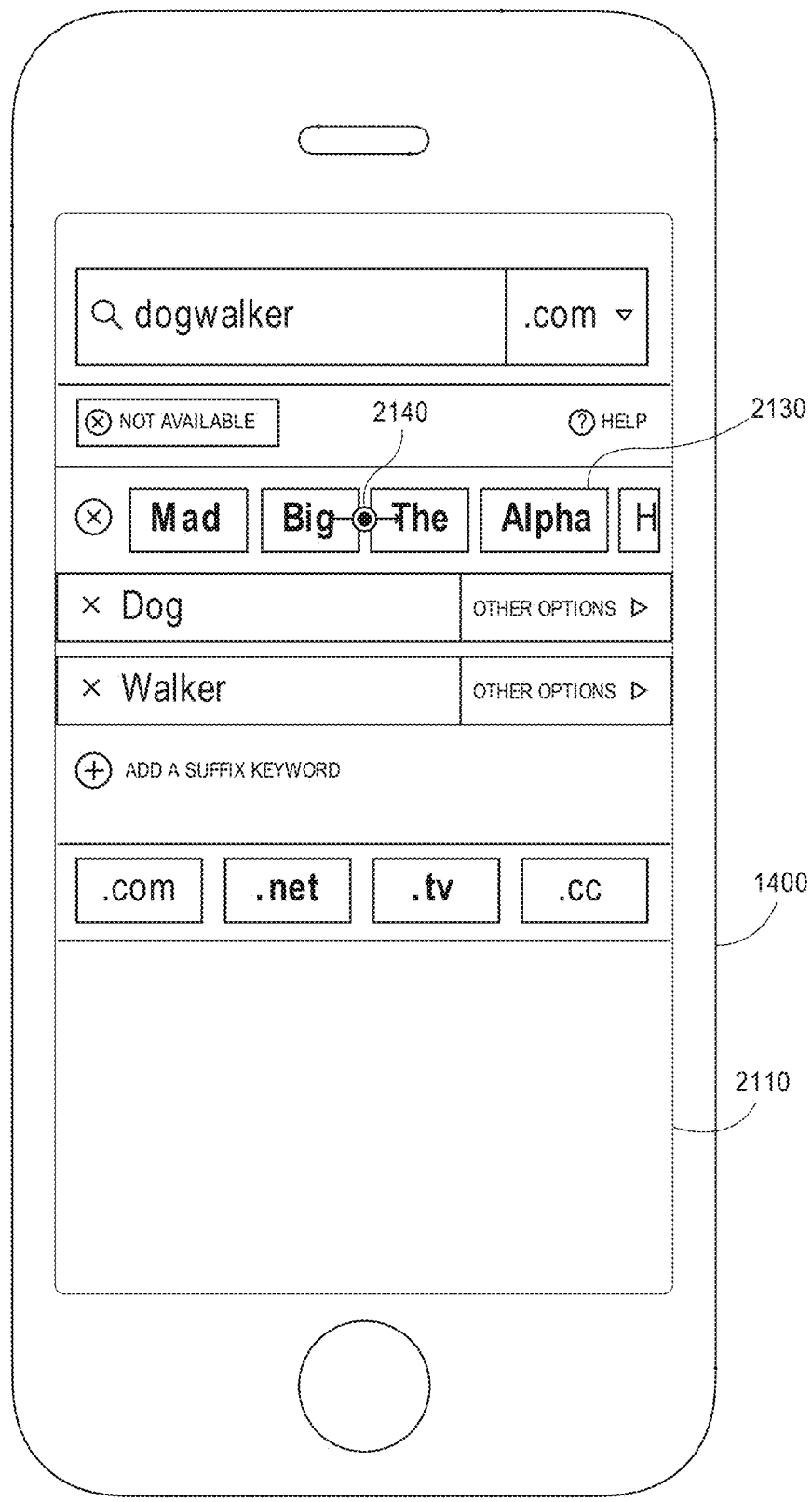
FIG. 21 illustrates an example of a graphical user interface of a mobile device showing a second image in a sequence, according to an embodiment.

The dynamically generated display can also include an add prefixes button 1630 and an add suffixes button 1640, which, when pressed (e.g., using a touchscreen) can result in a dynamically generated display of suggested affixes (e.g., prefixes and suffixes) to the keyword. In some embodiments, the add prefixes button 1630 or the add suffixes button 1640 may not be included in the dynamically generated display, and, instead, the dynamically generated display can include a list, which may be partial, of suggested prefixes and/or suggested suffixes (e.g., as shown in FIG. 21).

The dynamically generated display can also include other options buttons 1650 next to each of the keyword boxes (e.g., the boxes for "DOG" and "WALKER" in FIG. 16). The other options buttons 1650 can, when pressed (e.g., using a touchscreen) result in a dynamically generated display of suggested alternatives to the keywords.

The dynamically generated display can also include a button 1660 to allow the display of alternatives to the TLD.

Figure 17:
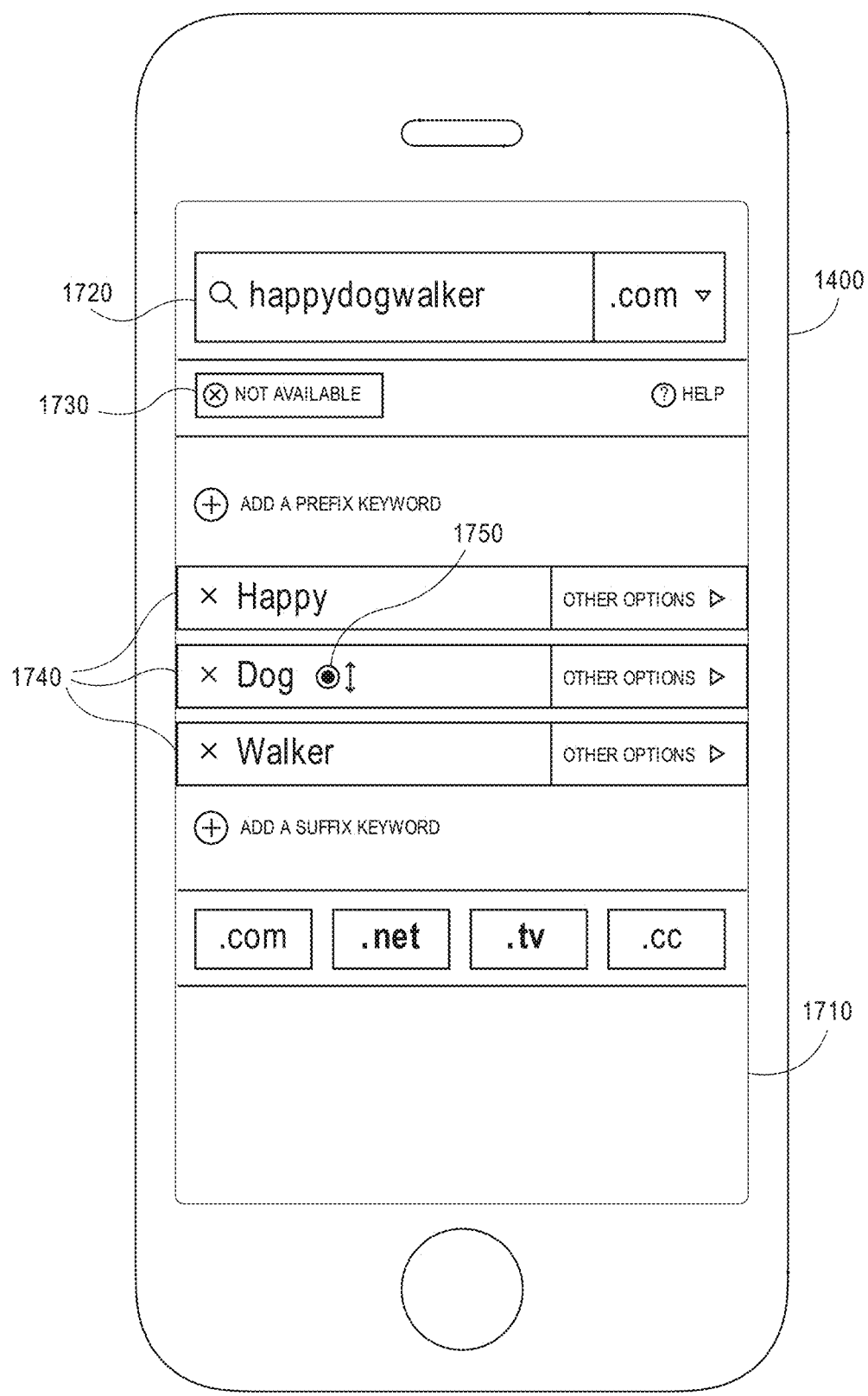
FIG. 17 illustrates an example of a graphical user interface of a mobile device showing a first image in a sequence, according to an embodiment.

FIG. 17 illustrates an example of a graphical user interface of the mobile device 1400 showing a first image in a sequence 1710, according to an embodiment. The first image in the sequence 1710 can, in some embodiments, represent a dynamically generated display presented to the user after an input string is entered into an input string box 1720 (e.g., "HAPPYDOGWALKER").

The dynamically generated display can include the input string "HAPPYDOGWALKER." Accordingly, "HAPPYDOGWALKER.COM" may be the current string. Additionally, the domain name "HAPPYDOGWALKER.COM" may not be available to be registered, which is indicated by the "not available" indicator 1730 in the embodiment shown in FIG. 17.

In the embodiment shown in FIG. 17, the input string "HAPPYDOGWALKER" has been tokenized into three keywords, "HAPPY," "DOG," and "WALKER." For example, the input string may be tokenized by recognizing that the input string contains three dictionary words, recognizing that the input string contains words that are in a predetermined list, and the like.

As shown in FIG. 17, the keywords may be displayed in boxes 1740. As further shown in FIG. 17, a touchscreen icon 1750 may be hovering over the "DOG" keyword box, and the user may have his/her finger pressed against the touchscreen over the "DOG" keyword box, which can result the touchscreen icon 1750 being presented on the graphical user interface. The touchscreen icon 1750 can indicate that the user can now drag and drop the "DOG" keyword box by moving his/her finger. In other embodiments, different icons or no icons at all can be used to indicate that the boxes can be dragged and dropped.

Figure 18:
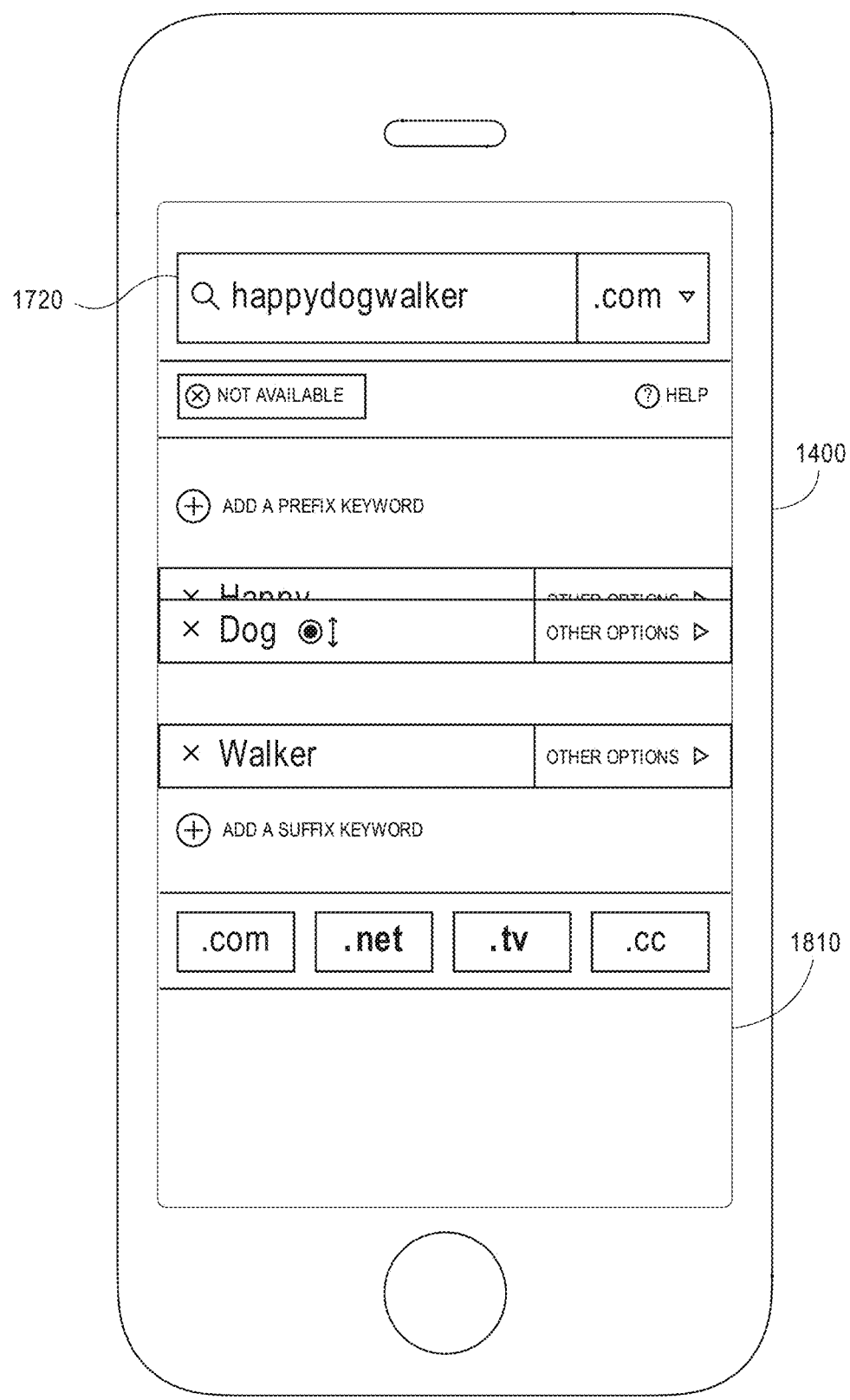
FIG. 18 illustrates an example of a graphical user interface of a mobile device showing a second image in a sequence, according to an embodiment.

FIG. 18 illustrates an example of the graphical user interface of the mobile device 1400 showing a second image in a sequence 1810, according to an embodiment. The second image in the sequence 1810 can, in some embodiments, represent a dynamically generated display presented to the user after an input string is entered into the input string box 1720 (e.g., "HAPPYDOGWALKER") and after the user begins to drag the "DOG" keyword box up.

In the embodiment shown in FIG. 18, the input string is still displayed as "HAPPYDOGWALKER" and may not have changed from FIG. 17. This can be because the user is in the process of dragging the "DOG" keyword box up over the "HAPPY" keyword box, and has not yet dropped or otherwise moved the "DOG" keyword box into a selected location.

Figure 19:
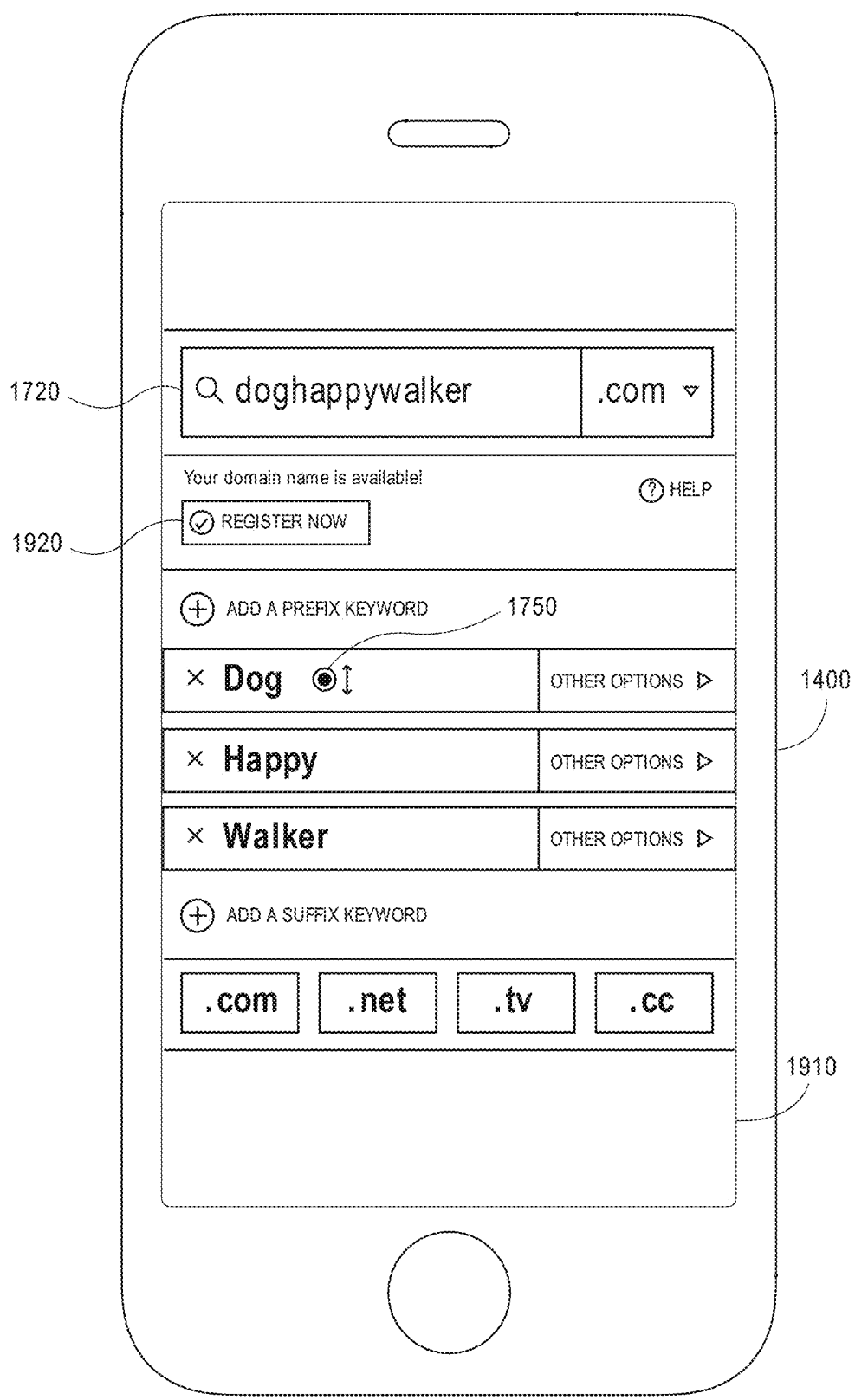
FIG. 19 illustrates an example of a graphical user interface of a mobile device showing a third image in a sequence, according to an embodiment.

FIG. 19 illustrates an example of the graphical user interface of the mobile device 1400 showing a third image in a sequence 1910, according to an embodiment. The third image in the sequence 1910 can, in some embodiments, represent a dynamically generated display presented to the user after the user has placed the "DOG" keyword box into a new location, in this example, above the "HAPPY" keyword box, and/or dropped the "DOG" keyword box into the new location.

In the embodiment shown in FIG. 19, the user may have dragged the "DOG" keyword box into the new location by touching his/her finger against the touchscreen and moving his/her finger. This is indicated by the touchscreen icon 1750 in the "DOG" keyword box remaining on the graphical user interface. Based on moving the "DOG" keyword box to the new location, the new input string is "DOGHAPPYWALKER," as shown in the input string box 1720, and the domain name "DOGHAPPYWALKER.COM" may be available to be registered, which is indicated by the "register now" indicator 1920 in the embodiment shown in FIG. 19.

In some embodiments, the availability of the current string may be updated simply by moving the keyword box to the new location, while, in other embodiments, the availability may not be updated until the user drops the keyword box into place by removing his/her finger from the touchscreen after moving the keyword box to the new location.

FIGS. 17-19 depict the user dragging a keyword box up one position. However, in other embodiments, the user may drag the keyword box down and/or may drag the keyword box two or more positions. As a result, the displayed current string and the availability of the current string can be updated accordingly, similar to the process described above for FIGS. 17-19.

Figure 20:
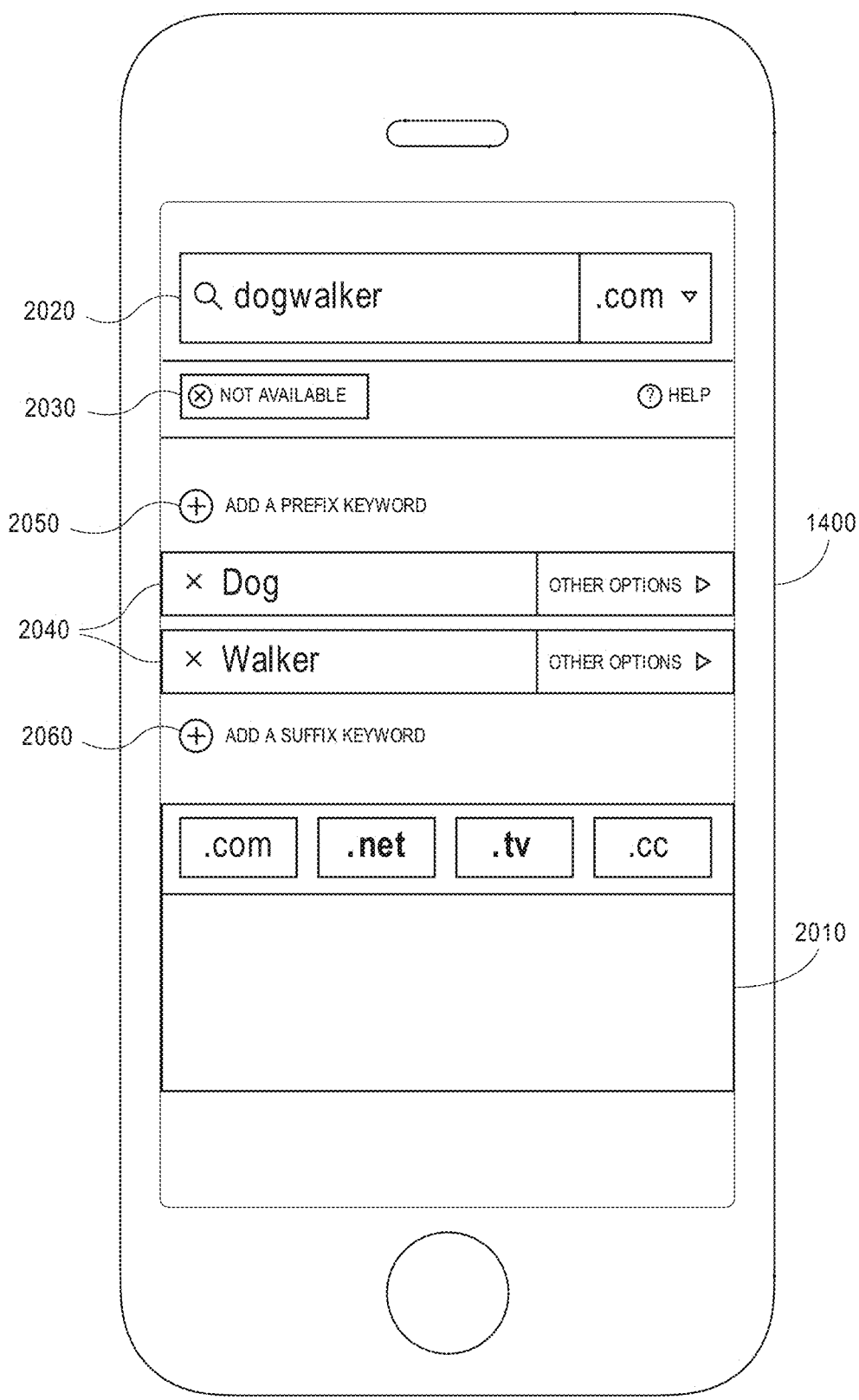
FIG. 20 illustrates an example of a graphical user interface of a mobile device showing a first image in a sequence, according to an embodiment.

FIG. 20 illustrates an example of a graphical user interface of the mobile device 1400 showing a first image in a sequence 2010, according to an embodiment. The first image in the sequence 2010 can, in some embodiments, represent a dynamically generated display presented to the user after an input string is entered into an input string box 2020 (e.g., "DOGWALKER").

The dynamically generated display can include the input string "DOGWALKER." Accordingly, "DOGWALKER.COM" may be the current string. Additionally, the domain name "DOGWALKER.COM" may not be available to be registered, which is indicated by the "not available" indicator 2030 in the embodiment shown in FIG. 20.

In the embodiment shown in FIG. 20, the input string "DOGWALKER" may have been tokenized into two keywords, "DOG" and "WALKER." For example, the input string may be tokenized by recognizing that the input string contains two dictionary words, recognizing that the input string contains words that are in a predetermined list, and the like.

As shown in FIG. 20, the keywords may be displayed in boxes 2040. As further shown in FIG. 20, the graphic user interface can include an add prefix icon or control 2050 and an add suffix icon or control 2060. In other embodiments, different controls or icons can be used to indicate that the prefixes and suffixes can be added by the user pressing his/her finger against the touchscreen.

FIG. 21 illustrates an example of the graphical user interface of the mobile device 1400 showing a second image in a sequence 2110, according to an embodiment. The second image in the sequence 2110 can, in some embodiments, represent a dynamically generated display presented to the user after an input string is entered into an input string box 2120 (e.g., "DOGWALKER") and after the user has activated (e.g., pressed and released) the add prefix icon 2050, shown in FIG. 20, using a touchscreen of the mobile device 1400.

The dynamically generated display can include a list, which may be partial, of suggested prefixes 2130. In this example, some of the one-step string sequences using the prefixes are available for registration as domain names, such as "MADDOGWALKER.COM" and "ALPHADOGWALKER.COM." This is indicated by the bolder/darker color of the text in the example of FIG. 21, but can be indicated using other techniques, as described above. Additionally, some of the one-step string sequences using the prefixes are not available for registration, as indicated in this example by their light color and the dashed outline of their letters. In other words, the graphical user interface shown indicates that the domain names "BIGDOGWALKER.COM" and "THEDOGWALKER.COM" are not available.

As further shown in FIG. 21, a touchscreen icon 2140 may be hovering over the partial list of suggested prefixes 2130, and the user may have his/her finger pressed against the touchscreen over the icon, which can result the touchscreen icon 2140 being presented on the graphical user interface. The touchscreen icon 2140 may indicate that the user can scroll through the partial list of suggested prefixes 2130 to allow the user to view all of the suggested prefixes that are generated. In other embodiments, different icons can be used to indicate that the user can scroll through the partial list of suggested prefixes 2130 and that the user has his/her finger pressed against the touchscreen. In further embodiments, the user can scroll through the partial list by swiping on the touchscreen (e.g., swiping left to scroll the list to the right), and no scrolling icon may be displayed.

Figure 22:
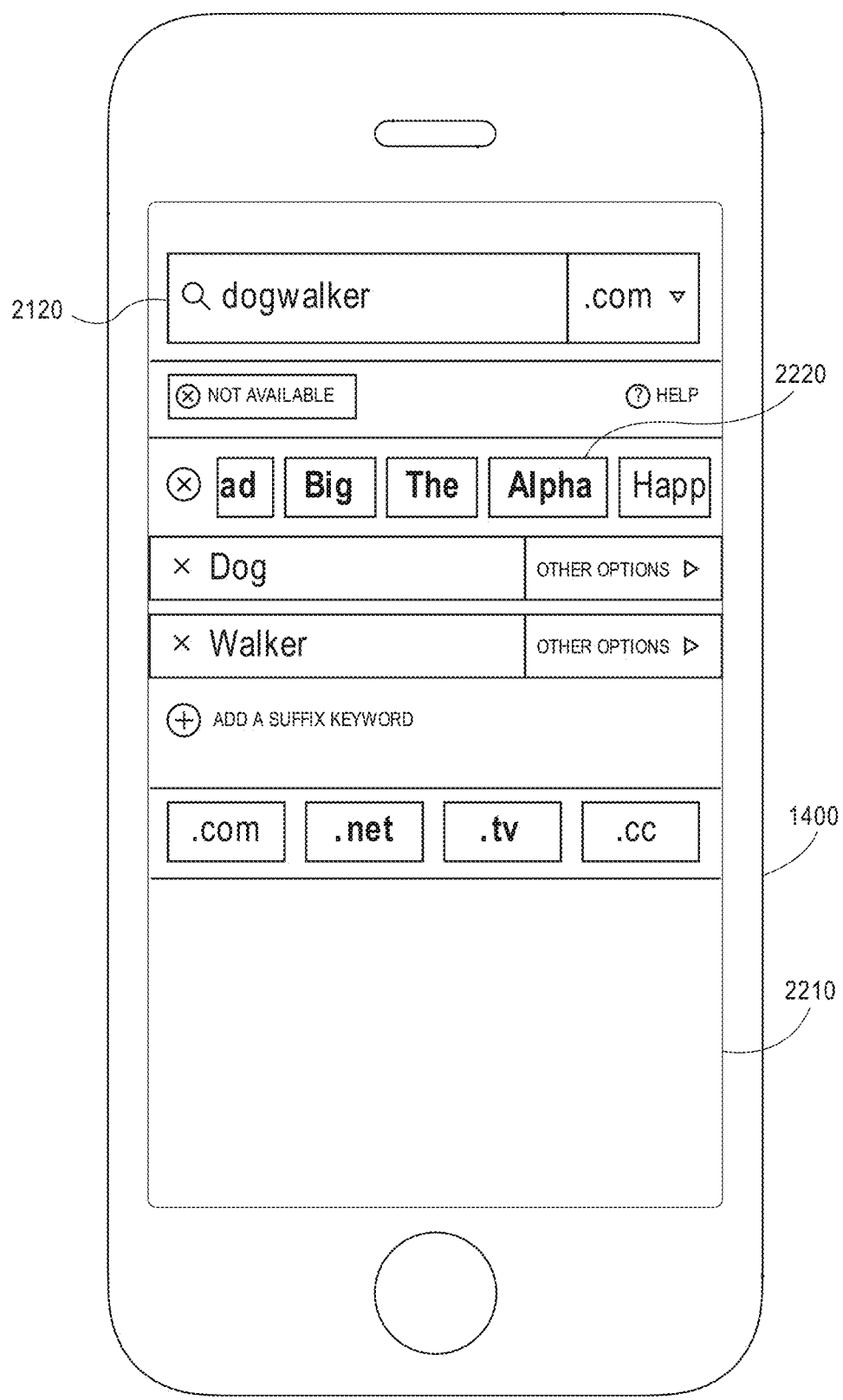
FIG. 22 illustrates an example of a graphical user interface of a mobile device showing a third image in a sequence, according to an embodiment.

FIG. 22 illustrates an example of the graphical user interface of the mobile device 1400 showing a third image in a sequence 2210, according to an embodiment. The third image in the sequence 2210 can, in some embodiments, represent a dynamically generated display presented to the user after an input string is entered into the input string box 2120 (e.g., "DOGWALKER"), after the user has scrolled to the right in the partial list of suggested prefixes 2220, shown in FIG. 21, and after the user has removed their finger from the touchscreen of a mobile device.

The dynamically generated display can include a second partial list of suggested prefixes 2220 that is different from the partial list of suggested prefixes 2130 shown in FIG. 21 because the user scrolled through the list using the touchscreen.

As further shown in FIG. 22, the second partial list of suggested prefixes 2220 includes the prefix "ALPHA." As indicated by the bolder/darker color, the one-step string sequence "ALPHADOGWALKER.COM" is available for registration as a domain name.

Figure 23:
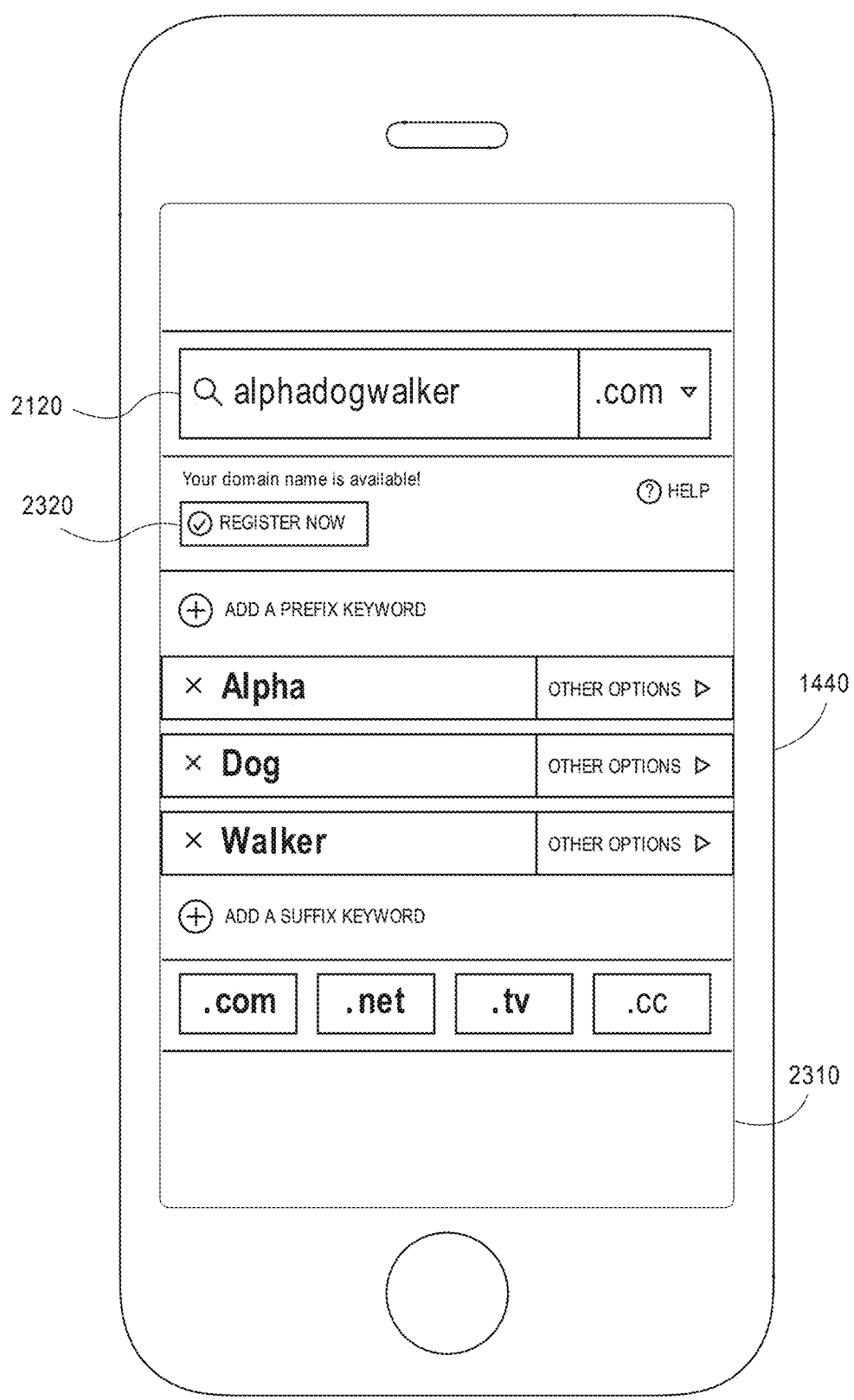
FIG. 23 illustrates an example of a graphical user interface of a mobile device showing a fourth image in a sequence, according to an embodiment.

FIG. 23 illustrates an example of the graphical user interface of the mobile device 1400 showing a fourth image in a sequence 2310, according to an embodiment. The fourth image in the sequence 2310 can, in some embodiments, represent a dynamically generated display presented to the user after an input string is entered into the input string box 2120 (e.g., "DOGWALKER"), after the user has scrolled to the right in the partial list of suggested prefixes (from 2130 in FIGS. 21 to 2220 in FIG. 22), and after the user has selected the prefix "ALPHA" from the partial list of suggested prefixes 2220, shown in FIG. 22.

The dynamically generated display can include the current string "ALPHADOGWALKER.COM." Accordingly, "ALPHADOGWALKER" now represents the input string. Additionally, the domain name "ALPHADOGWALKER.COM" may be available to be registered, which is indicated by the "register now" indicator 2320 in the embodiment shown in FIG. 23.

FIGS. 20-23 depict the user adding a prefix to the current string. However, in other embodiments, the user may add a suffix or an infix using a process similar to the process described above for FIGS. 20-23.

Figure 24:
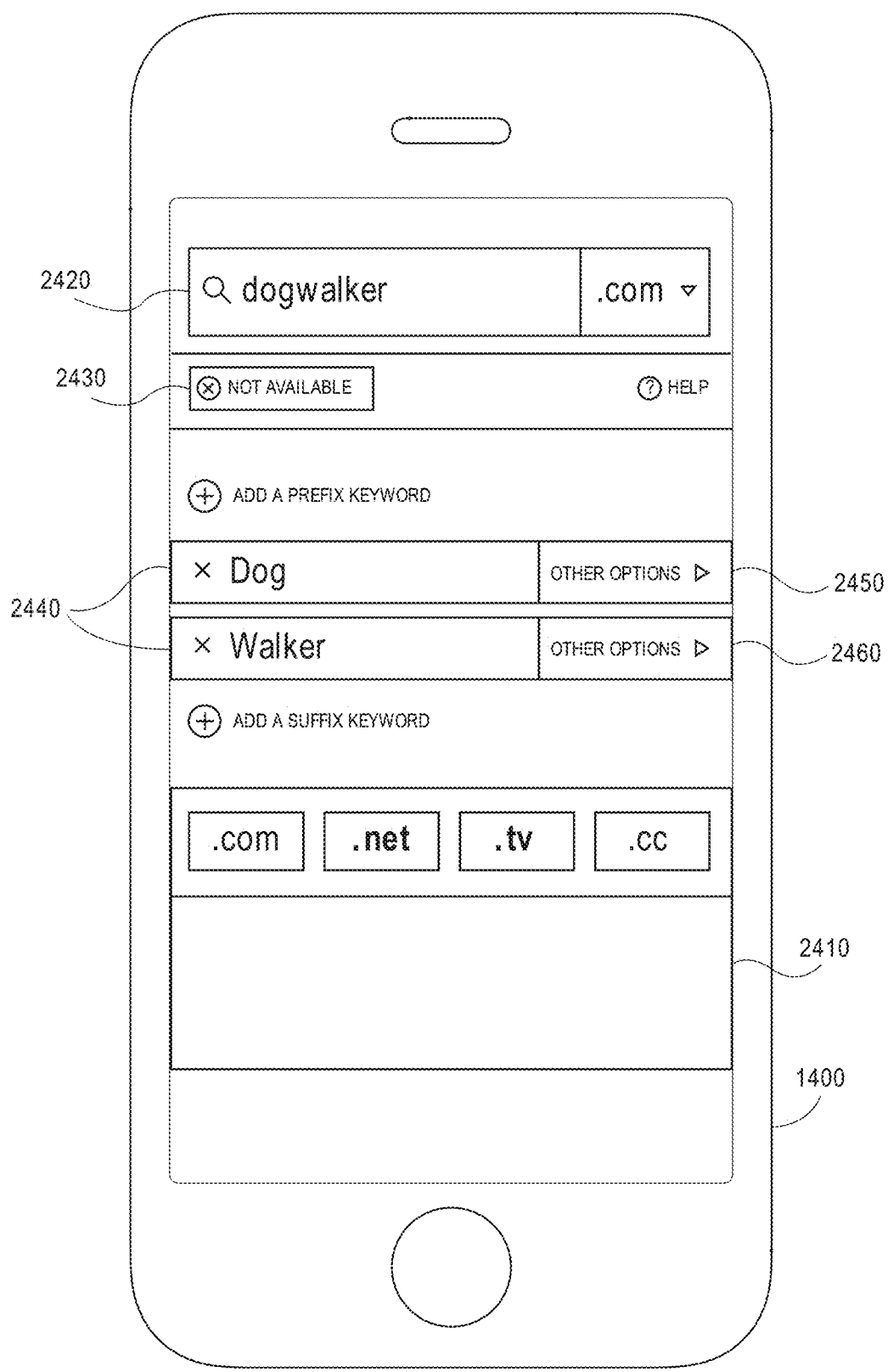
FIG. 24 illustrates an example of a graphical user interface of a mobile device showing a first image in a sequence, according to an embodiment.

FIG. 24 illustrates an example of a graphical user interface of the mobile device 1400 showing a first image in a sequence 2410, according to an embodiment. The first image in the sequence 2410 can, in some embodiments, represent a dynamically generated display presented to the user after an input string is entered into an input string box 2420 (e.g., "DOGWALKER").

The dynamically generated display can include the input string "DOGWALKER." Accordingly, "DOGWALKER.COM" may be the current string. Additionally, the domain name "DOGWALKER.COM" may not be available to be registered, which is indicated by the "not available" indicator 2430 in the embodiment shown in FIG. 24.

In the embodiment shown in FIG. 24, the input string "DOGWALKER" may have been tokenized into two keywords, "DOG" and "WALKER." For example, the input string may be tokenized by recognizing that the input string contains two dictionary words, recognizing that the input string contains words that are in a predetermined list, and the like.

As shown in FIG. 24, the keywords may be displayed in boxes 2440. As further shown in FIG. 24, the graphical user interface may include an other options box 2450 next to the "DOG" keyword box and an other options box 2460 next to the "WALKER" keyword box.

Figure 25:
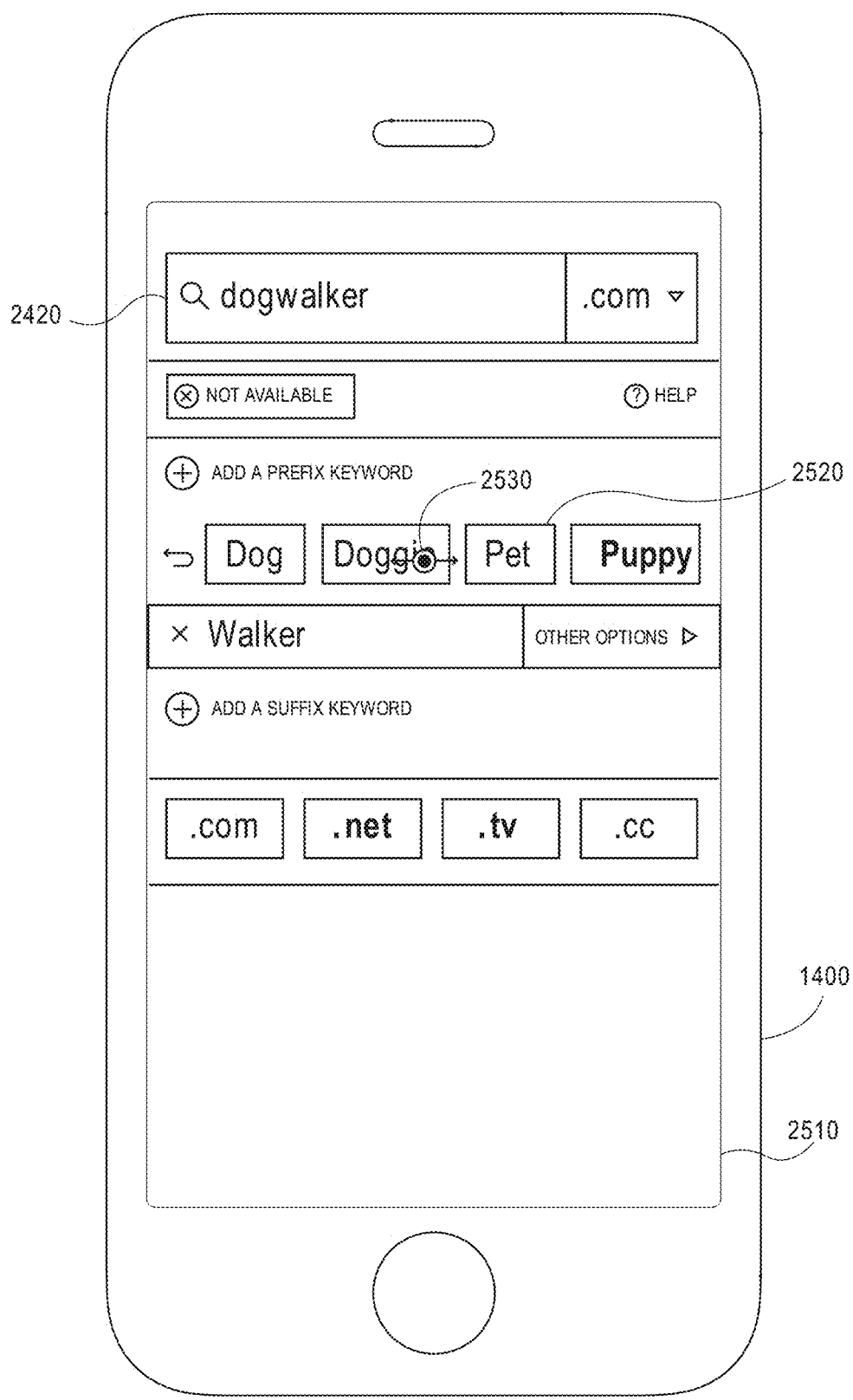
FIG. 25 illustrates an example of a graphical user interface of a mobile device showing a second image in a sequence, according to an embodiment.

FIG. 25 illustrates an example of the graphical user interface of the mobile device 1440 showing a second image in a sequence 2510, according to an embodiment. The second image in the sequence 2510 can, in some embodiments, represent a dynamically generated display presented to the user after an input string is entered into the input string box 2420 (e.g., "DOGWALKER") and after the user has pressed and released, or otherwise activated, the other options box 2450, shown in FIG. 24, using a touchscreen of the mobile device 1400.

The dynamically generated display can include a list, which may be partial, of suggested alternatives 2520 to the "DOG" keyword token. In this example, the one-step string sequence using the alternative "PUPPY" is available for registration as a domain name, "PUPPYWALKER.COM." This is indicated by the bolder/darker color of the text in the example of FIG. 25, but can be indicated using other techniques, as described above. Additionally, some of the one-step string sequences using the alternatives are not available for registration, as indicated in this example by their light color and the dashed outline of their letters. In other words, the graphical user interface shown indicates that the domain names "DOGGIEWALKER.COM" and "PETWALKER.COM" are not available.

As further shown in FIG. 25, a touchscreen icon 2530 may be hovering over the partial list of suggested alternatives 2520, and the user may have his/her finger pressed against the touchscreen over the touchscreen icon 2530, which can result in the addition of the touchscreen icon 2530. The touchscreen icon 2530 may indicate that the user can scroll through the partial list of suggested alternatives 2520 to allow the user to view all of the suggested alternatives that are generated. In other embodiments, different icons can be used to indicate that the user can scroll through the partial list of suggested alternatives 2520 and that the user has his/her finger pressed against the touchscreen, etc. In some embodiments, the user will scroll through the partial list by swiping on the touchscreen (e.g., swiping left to scroll the list to the right) and no scrolling icon may be displayed.

Figure 26:
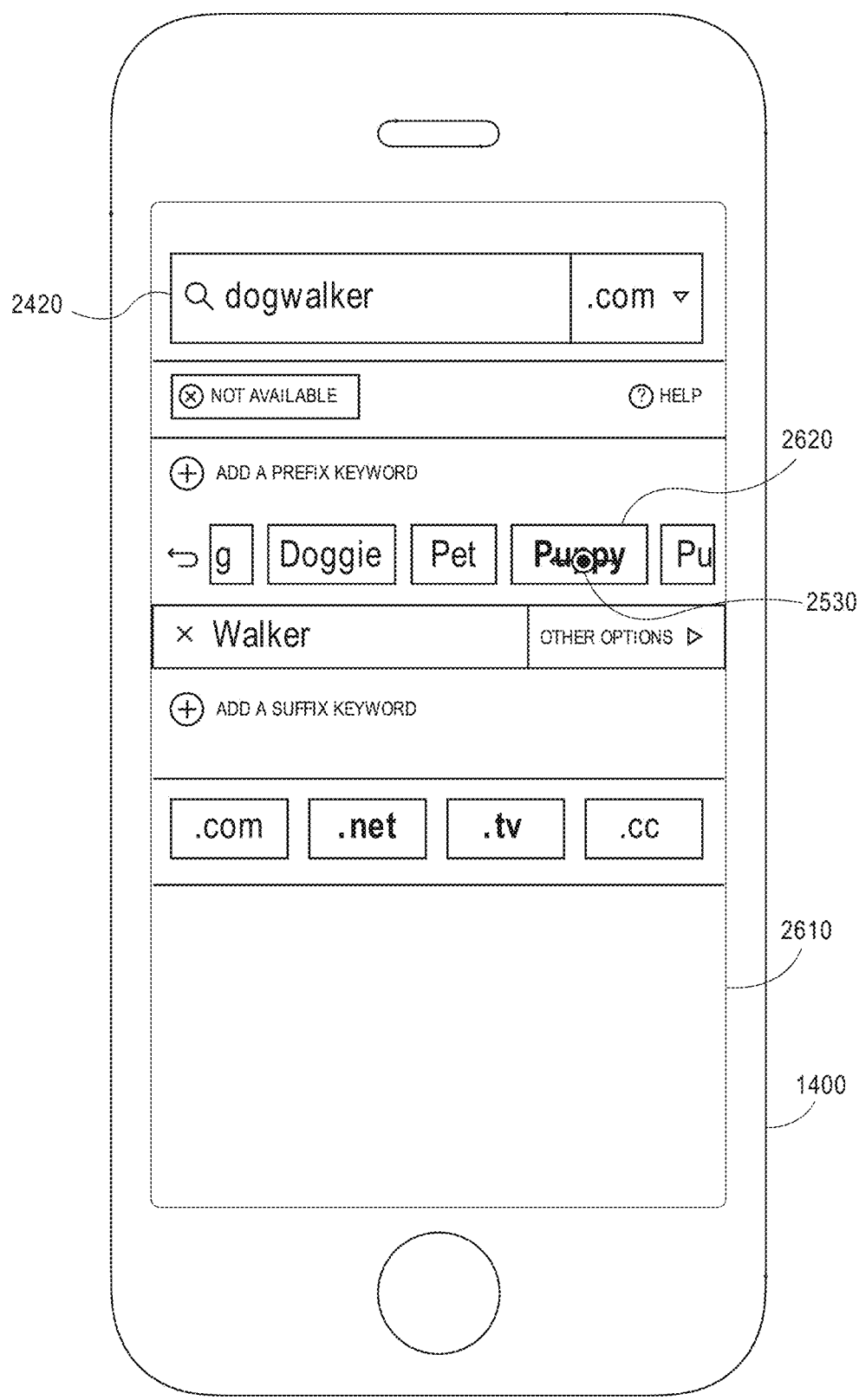
FIG. 26 illustrates an example of a graphical user interface of a mobile device showing a third image in a sequence, according to an embodiment.

FIG. 26 illustrates an example of the graphical user interface of the mobile device 1400 showing a third image in a sequence 2610, according to an embodiment. The third image in the sequence 2610 can, in some embodiments, represent a dynamically generated display presented to the user after an input string is entered into the input string box 2420 (e.g., "DOGWALKER"), after the user has scrolled to the right in the partial list of suggested alternatives 2520, shown in FIG. 25, and after the user has removed their finger from the touchscreen of a mobile device.

The dynamically generated display can include a second partial list of suggested alternatives 2620 that is different from the partial list of suggested alternatives 2520 shown in FIG. 25 because the user scrolled through the list using the touchscreen.

As further shown in FIG. 26, the touchscreen icon 2530 may be hovering over the alternative word "PUPPY," and the user may have his/her finger pressed against the touchscreen over the touchscreen icon 2530, which can result in the touchscreen icon 2530 remaining on the display. Under the touchscreen icon 2530, the alternative "PUPPY" can be selected by the user, which corresponds to the one-step string sequence "PUPPYWALKER.COM." As indicated by the bolder/darker color, this one-step string sequence may be available for registration.

Figure 27:
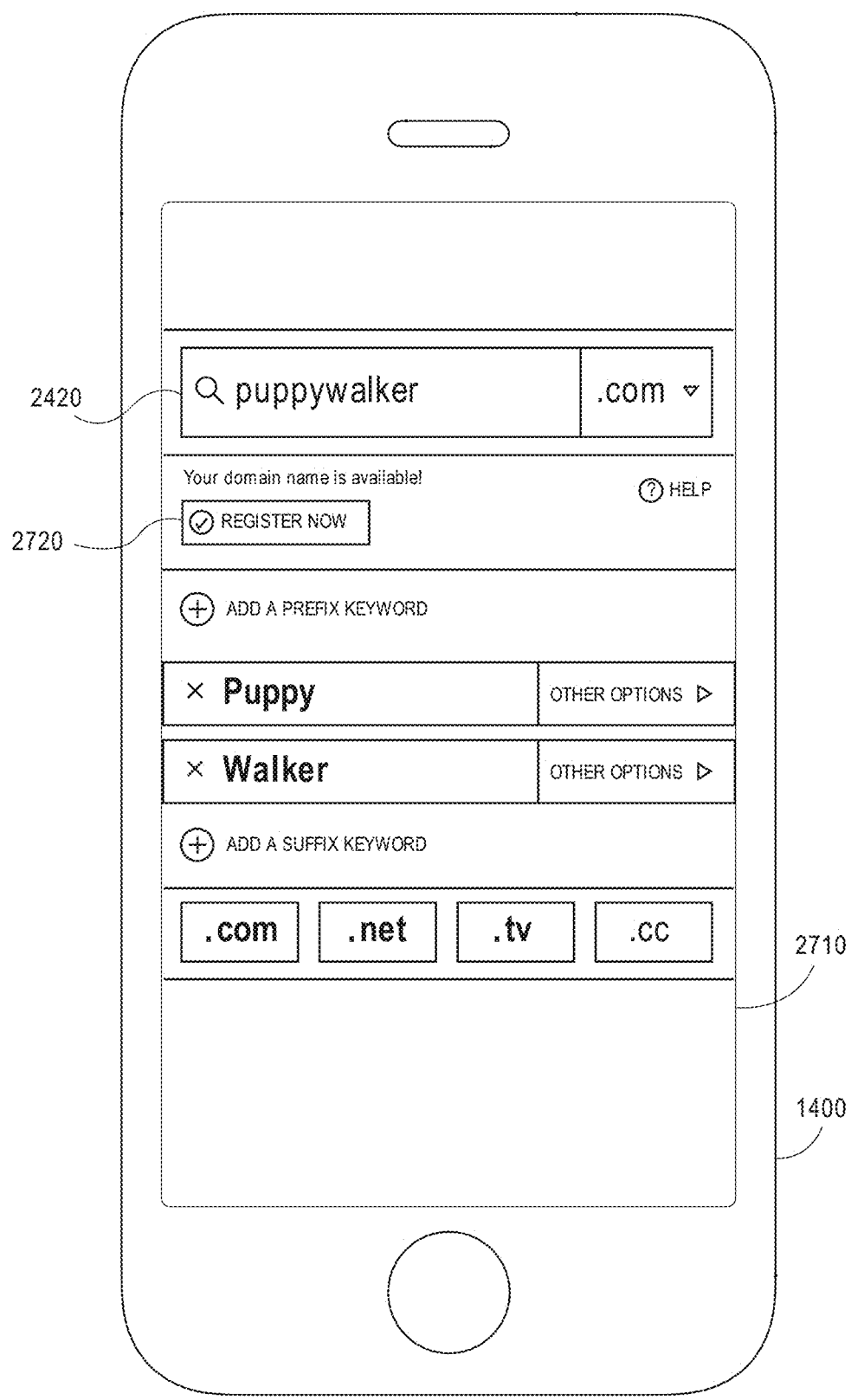
FIG. 27 illustrates an example of a graphical user interface of a mobile device showing a fourth image in a sequence, according to an embodiment.

FIG. 27 illustrates an example of the graphical user interface of the mobile device 1400 showing a fourth image in a sequence 2710, according to an embodiment. The fourth image in the sequence 2710 can, in some embodiments, represent a dynamically generated display presented to the user after an input string is entered into the input string box 2420 (e.g., "DOGWALKER"), after the user has scrolled to the right in the partial list of suggested alternatives (from 2520 in FIGS. 25 to 2620 in FIG. 26), and after the user has selected the alternative "PUPPY" from the partial list of suggested alternatives 2620, shown in FIG. 26.

The dynamically generated display can include the current string "PUPPYWALKER.COM." Accordingly, "PUPPYWALKER" now represents the input string. Additionally, the domain name "PUPPYWALKER.COM" may be available to be registered, which is indicated by the "register now" indicator 2720 in the embodiment shown in FIG. 27.

Figure 28:
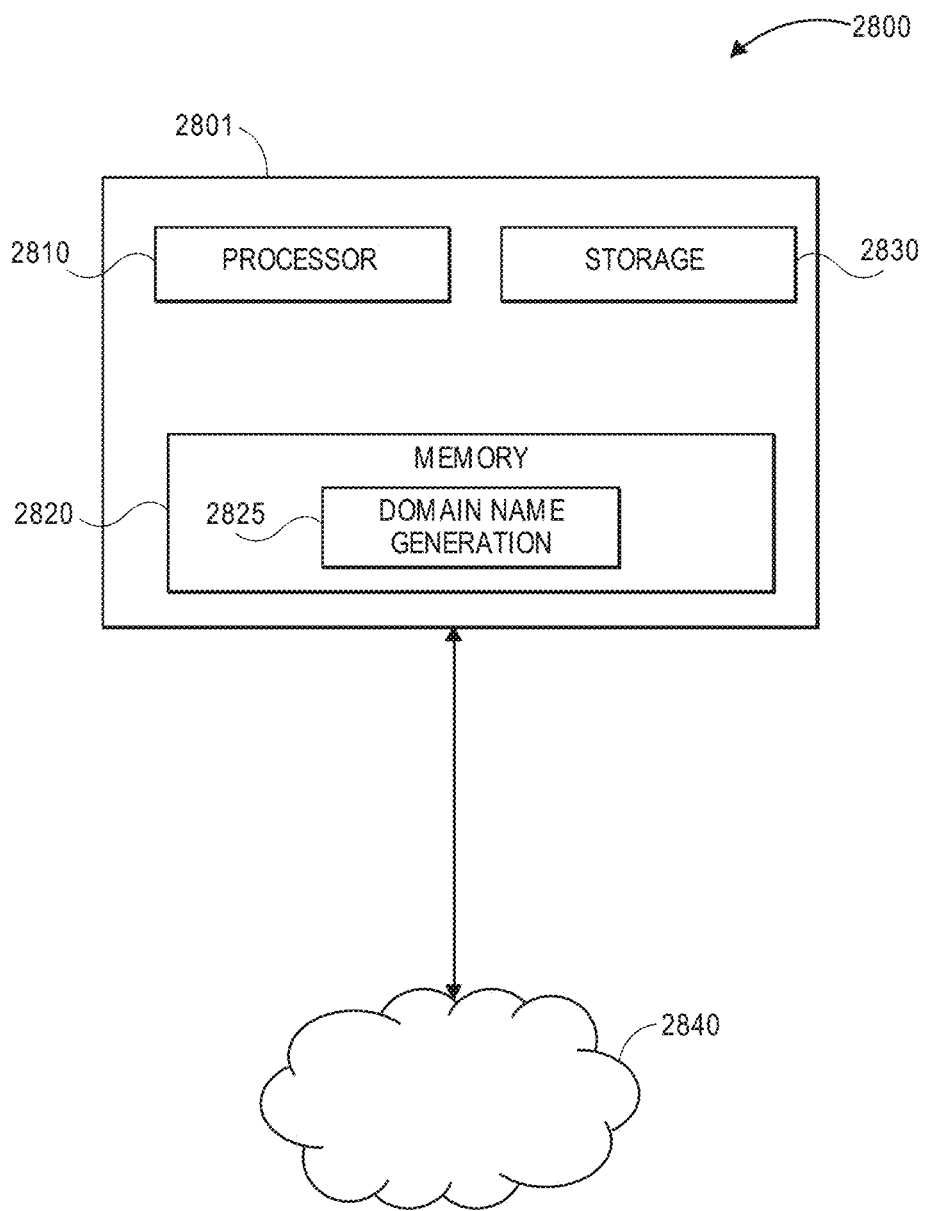
FIG. 28 is a diagram illustrating an example of a hardware system for domain name generation, according to an embodiment.

FIG. 28 is a diagram illustrating an example of a hardware system that is suitable for domain name generation, consistent with certain disclosed embodiments. An example hardware system 2800 includes examples of system components that may be used. The components and arrangement, however, may be varied.

Computer 2801 may include processor 2810, memory 2820, storage 2830, and input/output (I/O) devices (not pictured). The computer 2801 may be implemented in various ways and can be configured to perform any of the embodiments described above. In some embodiments, computer 2801 can be a computer of an end-user such as, for example, a desktop computer, a laptop, a mobile device (e.g., a smartphone or a tablet device), etc. In other embodiments, computer 2801 can be a networked computing device such as, for example, a database server (e.g., a domain name registry and/or name server), a web server, a mainframe computer, etc. Computer 2801 may be standalone or may be part of a subsystem, which may, in turn, be part of a larger system.

The processor 2810 may include one or more known processing devices, such as a microprocessor from the Intel Core™ family manufactured by Intel™, the Phenom™ family manufactured by AMD™, or the like. Memory 2820 may include one or more storage devices configured to store information and/or instructions used by processor 2810 to perform certain functions and operations related to the disclosed embodiments. Storage 2830 may include a volatile or non-volatile, magnetic, semiconductor, tape, optical, removable, non-removable, or other type of computer-readable medium used as a storage device, including various types of non-transitory computer-readable media. In some embodiments, storage 2830 can include, for example, domain name records.

In an embodiment, memory 2820 may include one or more programs or subprograms including instructions that may be loaded from storage 2830 or elsewhere that, when executed by computer 2801, perform various procedures, operations, or processes consistent with disclosed embodiments. For example, memory 2820 may include a domain name generation program 2825 for providing a graphical user interface, receiving user input, tokenizing strings into keywords, determining alternative keywords, determining affixes, determining alternative TLDs, determining one-step string sequences, determining availability of domain names associated with current strings and/or one-step string sequences, generating dynamic displays corresponding to generated domain names, etc. Memory 2820 may also include other programs that perform other functions, operations, and processes, such as programs that provide communication support, Internet access, etc. The domain name generation program 2825 may be embodied as a single program, or alternatively, may include multiple sub-programs that, when executed, operate together to perform the function of the domain name generation program 2825 according to disclosed embodiments. In some embodiments, domain name generation program 2825 can perform all or part of the process of FIG. 7, described above, and/or provide the graphical user interfaces shown in FIGS. 1-6 and 8-27, described above.

Computer 2801 may communicate over a link with network 2840. For example, the link may be a direct communication link, a local area network (LAN), a wide area network (WAN), or other suitable connection. Network 2840 may include the internet, as well as other networks, which may be connected to various systems and devices.

Computer 2801 may include one or more input/output (I/O) devices (not pictured) that allow data to be received and/or transmitted by computer 2801. I/O devices may also include one or more digital and/or analog communication I/O devices that allow computer 2801 to communicate with other machines and devices. I/O devices may also include input devices such as a keyboard or a mouse, and may include output devices such as a display or a printer. Computer 2801 may receive data from external machines and devices and output data to external machines and devices via I/O devices. The configuration and number of input and/or output devices incorporated in I/O devices may vary as appropriate for various embodiments.

Examples of uses of the system 2800 can be described by way of example with reference to the embodiments described above The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing examples of implementations, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." In addition, where features or aspects of the disclosure are described in terms of Markush groups, those skilled in the art will recognize that the disclosure is also thereby described in terms of any individual member or subgroup of members of the Markush group.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for generating a domain name using a user interface comprising:
    displaying, at the user interface, a text area and a top-level-domain (TLD) area to designate a domain name;
    dynamically displaying, in the text area at the user interface, an input string received from a user, wherein the input string comprises one or more keywords that are displayed separately;
    dynamically displaying, at the user interface, a plurality of alternative keywords for each keyword of the one or more keywords and a plurality of TLDs;
    dynamically displaying, in the text area at the user interface, an updated string comprising a selected keyword selected by the user from the plurality of alternative keywords;
    dynamically displaying, in the TLD area at the user interface, a TLD; and
    dynamically displaying, at the user interface, an indication whether a domain name is available to be registered, wherein the domain name is based on displayed contents of the text area and the TLD area.

2. The method of claim 1, further comprising dynamically displaying, at the user interface, an indication whether each of the alternative keywords is available to be registered as part of a domain name comprising the alternative keyword.

3. The method of claim 1, wherein the indication whether the domain name is available to be registered comprises at least one of a visual indicator or an aural indicator.

4. The method of claim 1, further comprising dynamically displaying, at the user interface, a second plurality of alternative keywords to replace the plurality of alternative keywords based on a vertically swiping motion received from the user.

5. The method of claim 1, wherein the user interface comprises a user-selectable icon to select a value corresponding to a similarity of suggestions for the alternative keywords.

6. The method of claim 1, wherein the TLD area initially comprises a default TLD.

7. The method of claim 1, further comprising dynamically displaying, at the user interface, a plurality of affixes.

8. The method of claim 7, wherein the plurality of affixes comprises at least one of a plurality of prefixes or a plurality of suffixes.

9. The method of claim 8, wherein each plurality of alternative keywords is displayed below the corresponding keyword, wherein the plurality of prefixes is displayed to the left of the text area, and wherein the plurality of suffixes is displayed to the right of the text area.

10. The method of claim 1, wherein the text area comprises a dynamically adjustable line below each keyword in the text area.

11. The method of claim 1, wherein the user interface comprises a remove keyword button for each plurality of alternative keywords.

12. A method for generating a domain name using a user interface comprising:
displaying, at the user interface, a text area and a top-level-domain (TLD) area to designate a domain name;
dynamically displaying, in the text area at the user interface, an input string received from a user, wherein the input string comprises two or more keywords;
dynamically displaying, at the user interface, the two or more keywords separately from each other and separately from the text area,
dynamically displaying, at the user interface, a plurality of alternative keywords for each keyword and a plurality of TLDs, wherein each keyword and corresponding alternative keywords are displayed together in a keyword box;
dynamically displaying, at the user interface, reordering of the keyword boxes based on user input;
dynamically displaying, in the text area at the user interface, an updated string based on the reordered keyword boxes;
dynamically displaying, in the TLD area at the user interface, a TLD; and
dynamically displaying, at the user interface, an indication whether a domain name is available to be registered, wherein the domain name is based on displayed contents of the text area and the TLD area.

13. The method of claim 12, wherein when the keyword boxes are reordered, the keyword boxes are reordered from left to right, and the input string in the text area is correspondingly reordered.

14. The method of claim 13, further comprising updating the indication whether a domain name is available to be registered based on the reordered input string in the text area.

15. The method of claim 12, wherein each keyword box comprises a user-selectable icon to move the keyword box and re-order the keyword boxes and a user-selectable icon to remove the keyword box.

16. The method of claim 12, wherein the indication whether the domain name is available to be registered comprises at least one of a visual indicator or an aural indicator.

17. The method of claim 12, further comprising dynamically displaying, at the user interface, a plurality of affixes.

18. The method of claim 17, wherein the plurality of affixes comprises at least one of a plurality of prefixes or a plurality of suffixes.

19. The method of claim 18, wherein the plurality of prefixes are displayed in a prefix box, and wherein the plurality of suffixes are displayed in a suffix box.

20. The method of claim 19, wherein the prefix box is displayed to the left of the one or more keyword boxes, and wherein the suffix box is displayed to the right of the one or more keyword boxes.

21. A method for generating a domain name using a user interface comprising:
displaying, at the user interface, a text area and a top-level-domain (TLD) area to designate a domain name;
dynamically displaying, in the text area at the user interface, an input string received from a user, wherein the input string comprises two or more keywords;
dynamically displaying, at the user interface, each of the two or more keywords in keyword boxes, wherein the keyword boxes are displayed separately from the text area, wherein each keyword box comprises a user-selectable icon to display a plurality of alternative keywords for the respective keyword;
dynamically displaying, at the user interface, reordering of the keyword boxes based on user input;
dynamically displaying, in the text area at the user interface, an updated string based on the reordered keyword boxes;
dynamically displaying, in the TLD area at the user interface, a TLD; and
dynamically displaying, at the user interface, an indication whether a domain name is available to be registered, wherein the domain name is based on displayed contents of the text area and the TLD area.

22. The method of claim 21, wherein the user input for reordering of the keyword boxes is based on user interaction with an icon in a keyword box to be reordered.

23. The method of claim 21, further comprising:
upon detecting selection of the user-selectable icon to display a plurality of alternative keywords, dynamically displaying, at the user interface, the plurality of alternative keywords in place of the keyword box associated with the user-selectable icon, wherein the keyword box associated with the user-selectable icon is removed from the user interface.

24. The method of claim 23, further comprising:
dynamically displaying, at the user interface, an indication whether each of the alternative keywords is available to be registered as part of a domain name comprising the alternative keyword.

25. The method of claim 23, further comprising:
upon detecting selection by the user of an alternative keyword from the displayed alternative keywords, dynamically displaying, at the user interface, the selected alternative keyword in a keyword box;

dynamically displaying, in the text area at the user interface, an updated string comprising the selected alternative keyword selected by the user from the plurality of alternative keywords; and updating the indication whether a domain name is available to be registered based on the updated string in the text area.

26. The method of claim 23, further comprising:

dynamically displaying, at the user interface, a second plurality of alternative keywords to replace the plurality of alternative keywords based on a horizontally swiping motion received from the user.

27. The method of claim 21, further comprising:

dynamically displaying, at the user interface, a user-selectable icon to display a plurality of suggested prefixes.

28. The method of claim 27, further comprising:

upon detecting selection of the user-selectable icon, dynamically displaying, at the user interface, the plurality of suggested prefixes in a prefix area;

upon detecting a selection of a prefix from the plurality of suggested prefixes, adding the selected prefix to the text area to obtain an updated input string in the text area; and updating the indication whether a domain name is available to be registered based on the updated input string in the text area.

29. The method of claim 27, further comprising:

upon detecting selection of the user-selectable icon, dynamically displaying, at the user interface, the plurality of suggested prefixes in a prefix area; and upon detecting a user selection of the prefix area to display additional suggested prefixes in a prefix area, dynamically displaying, at the user interface, a plurality of additional suggested prefixes in the prefix area.

30. The method of claim 27, wherein detecting the user selection of the prefix area to display additional suggested prefixes comprises detecting a user swiping left to right or right to left in the prefix area.

31. The method of claim 21, further comprising:

dynamically displaying, at the user interface, a user-selectable icon to display a plurality of suggested suffixes.

* * * * *